US007245651B1

(12) United States Patent
Miao et al.

(10) Patent No.: US 7,245,651 B1
(45) Date of Patent: Jul. 17, 2007

(54) DUAL MODE FILTER FOR MOBILE TELECOMMUNICATIONS

(75) Inventors: George J. Miao, Tempe, AZ (US); Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/467,611

(22) Filed: Dec. 20, 1999

(51) Int. Cl.
    *H04B 1/00* (2006.01)
(52) U.S. Cl. ............................... 375/147; 375/316
(58) Field of Classification Search ............... 708/313, 708/319; 375/350, 130, 150, 142, 143, 144, 375/148, 140, 152, 219, 295, 316, 346, 147; 370/335, 344, 441, 342
See application file for complete search history.

(56) References Cited

U.S. PATENT DOCUMENTS

| | | | | |
|---|---|---|---|---|
| 5,136,577 A * | 8/1992 | Amano et al. | ............. | 370/32.1 |
| 5,341,135 A * | 8/1994 | Pearce | ......................... | 341/120 |
| 5,574,995 A * | 11/1996 | Masaki | ..................... | 455/161.2 |
| 5,617,060 A * | 4/1997 | Wilson et al. | ............... | 330/129 |
| 5,717,617 A * | 2/1998 | Chester | ..................... | 708/313 |
| 6,035,213 A * | 3/2000 | Tokuda et al. | ............ | 455/553.1 |
| 6,097,974 A * | 8/2000 | Camp, Jr. et al. | ........... | 455/575 |
| 6,125,268 A * | 9/2000 | Boesch et al. | ............. | 455/168.1 |
| 6,195,383 B1 * | 2/2001 | Wishart et al. | .............. | 375/136 |
| 6,205,334 B1 * | 3/2001 | Dent | .......................... | 455/434 |
| 6,279,019 B1 * | 8/2001 | Oh et al. | .................... | 708/300 |
| 6,282,184 B1 * | 8/2001 | Lehman et al. | ............. | 370/342 |
| 6,295,461 B1 * | 9/2001 | Palmer et al. | ............... | 455/557 |
| 6,370,361 B1 * | 4/2002 | Hung et al. | .................... | 455/83 |
| 6,385,262 B1 * | 5/2002 | Gustafsson et al. | ......... | 375/350 |
| 6,426,983 B1 * | 7/2002 | Rakib et al. | ................ | 375/346 |
| 6,433,906 B1 * | 8/2002 | Farhan | ....................... | 359/167 |
| 6,459,743 B1 * | 10/2002 | Lipka | .......................... | 375/329 |
| 6,480,477 B1 * | 11/2002 | Treadaway et al. | ......... | 370/314 |

(Continued)

OTHER PUBLICATIONS

Srinivasan et al., "Design and Analysis of Receiver Filters for Multiple Chip-Rate DS-CDMA Systems", IEEE Journal on Selecte Areas in Communications, vol. 17, No. 12, Dec. 1999, pp. 2096-2109.*

(Continued)

*Primary Examiner*—Chieh M. Fan
*Assistant Examiner*—Jason M. Perilla
(74) *Attorney, Agent, or Firm*—Trop, Pruner & Hu, P.C.

(57) ABSTRACT

A dual mode filter for mobile communication may implement two disparate cellular systems such as GSM and W-CDMA. The same transceiver may be utilized to selectively receive and transmit in either of the two systems. When the system is in a GSM area, the system sends and receives GSM signals using programmable filters. Two cascaded digital decimation filters may substitute for one narrow band digital decimation filter in conventional designs. One of the filters is a multi-band digital decimation filter with N bands and the other of the digital filters is used to reject the N−1 multi-band of the system. The number of taps on each filter may selectively be set to implement either GSM or W-CDMA. In addition, the output for the system may be set to be the output of the first filter, in the case of a W-CDMA system, or the combination of the two cascaded filters in a GSM system.

27 Claims, 18 Drawing Sheets

U.S. PATENT DOCUMENTS

| | | | |
|---|---|---|---|
| 6,480,528 B1* | 11/2002 | Patel et al. | 375/148 |
| 6,487,221 B1* | 11/2002 | Bertrand et al. | 370/497 |
| 6,493,358 B1* | 12/2002 | Soleymani | 370/480 |
| 6,570,907 B1* | 5/2003 | Dent et al. | 375/130 |
| 6,584,090 B1* | 6/2003 | Abdelgany et al. | 370/342 |
| 6,590,943 B1* | 7/2003 | Ali | 375/332 |
| 6,603,812 B1* | 8/2003 | Oprescu | 375/232 |
| 6,611,855 B1* | 8/2003 | Hellberg et al. | 708/420 |
| 6,647,070 B1* | 11/2003 | Shalvi et al. | 375/285 |
| 6,683,919 B1* | 1/2004 | Olgaard et al. | 375/316 |
| 6,807,405 B1* | 10/2004 | Jagger et al. | 455/296 |
| 7,035,888 B2* | 4/2006 | Lee | 708/313 |
| 2005/0245201 A1* | 11/2005 | Ella et al. | 455/78 |

OTHER PUBLICATIONS

Adachi et al., "Wideband Multi-Rate DS-CDMA for Next Generation Mobile Communication Systems", IEEE 1997 Wireless Communications Conference, May 1997, pp. 57-62.*

Sampaio-Neto et al., "Carrier Recovery Performance in PSK Systems Using Transmission Pulses with a Square Root Raised Cosine Spectrum", Telecommunications Symposium 1990. ITS '90 Symposium Record., SBT/IEEE International, Sep. 1990, pp. 529-534.*

Fred Harris, "On the Design of Pre-Equalized Square-Root Raised Cosine Matched Filters for DSP Based Digital Receivers", Signals, Systems and Computers 1993. 1993 Conference Record of the Twenty-Seventh Asilomar Conference, Nov. 1993, vol. 2, pp. 1291-.*

Jian et al., "An Efficient IF Architecture for Dual-Mode GSM/W-CDMA Receiver of a Software Radio", IEEE 1999 International Workshop on Mobile Multimedia Communications 1999, Nov. 15-17, 1999, pp. 21-24.*

"Complete 3V GSM/DCS1800 Codec, Preliminary Technical Information AD 7015", Analog Devices, Norwood, MA, Sep. 1995, pp. 1-48.

Tinku Acharya and George J. Miao, U.S. Appl. No. 09/467,487, filed Dec. 20, 1999, entitled "Chip Rate Selectable Square Root Raised Cosine Filter for Mobile Telecommunications".

* cited by examiner

DUAL MODE FILTER FOR MOBILE TELECOMMUNICATIONS

BACKGROUND

This invention relates generally to digital wireless mobile communications.

Code division multiple access (CDMA) for digital wireless mobile communications involves using correlation techniques to allow a receiver to decode one signal among many that are transmitted on the same carrier at the same time. Each user's signal includes a unique code that appears to be noise to all except the correct receiver. A channel in the code domain describes a combination of a carrier frequency and a code. CDMA generally starts out with a narrow band signal, which for full speech is 9600 bps. This signal is spread with the use of specialized codes to a bandwidth of 1.23 MHz. The ratio of the spread data rate to the initial data rate is called the processing gain.

Currently available cellular technology makes use of what is called second generation or "2G" technology. Initially, cellular telephone technology was implemented with Advanced Mobile Phone Systems (AMPS) which were analog. In about 1995, digital systems, such as CDMA, were introduced.

The global system for mobile communication (GSM) uses gaussian minimum shift keying (GMSK) modulation. GSM uses time division multiple access (TDMA) technology. Multiple users operate on the same radio channel simultaneously by sharing time slots. The GSM system allows eight mobile telephones to share a single 200 kHz bandwidth radio carrier channel for voice or data communications. For duplex operations, GSM voice communications are conducted on two 200 kHz wide carrier frequency channels.

The 200 kHz wide channels are called an absolute radio frequency channel numbers (ARFCN). The ARFCN denotes a forward and reverse channel pair, separated in frequency by 45 MHz, and each channel is time shared between as many as eight subscribers. Each time slot has a duration of 156.25 bits and occupies a time interval of 0.577 ms. Therefore, the transmission bit rate on each carrier to support eight physical channels is 156.25/0.577 or 270.8333 kbps using binary (BT=0.3) GMSK modulation. The effective channel transmission rate per user is 33.854 kbps (270.833 kbps/for 8 users).

A number of competing third generation or "3G" technologies are being debated within the industry at this time. The goal of the 3G technologies is to offer higher bit rate services. Such services may include multimedia, including video, Internet and electronic mail.

One standard for 3G technologies is the IMT-2000 standard which was propounded by the International Telecommunications Union (ITU). IMT stands for International Mobile Telecommunications and IMT-2000 is the name for Future Public Land Mobile Telecommunications Systems (FPLMTS). FPLMTS is targeted at developing mobile telecommunications systems to be used "anywhere-anyplace" around the year 2000 operating at approximately 2000 MHz.

In 3G technology, a "bit" is the fundamental information unit of input data. A "symbol" is a grouping of data bits based on modulation. Thus, a symbol arises after encoding but prior to spreading. A "chip" is the minimum bit period of the final spread data. "Channels" include physical channels that are transmitted in the air, defined by a frequency and code. A transport channel is defined by how the data is sent and logical channels are defined by the type of data.

The so-called wideband or W-CDMA technology has been proposed as the 3G solution by the European Telecommunications Standards Institute (ETSI) as their proposal to the ITU for IMT-2000. ETSI's proposal is identified as UTRA (Universal Mobile Telecommunication System Terrestrial Radio Access). (The standard can be found at www.itu.int/imt/2-radio_dev/proposals/index.html.)

Due to the proliferation of telephone standards and systems, it would be desirable to have a telephone which operates with more than one standard. However, conventionally, such phones are considered to be impractical because they generally require substantial duplication of the receiver and transmitter sections. This arises mainly due to the fact that the standards in many cases are so different that it is believed that separate electronics are necessary.

Thus, there is a continuing need for a dual mode phone which operates using more than one standard and enables a user to use the same telephone in areas which operate under different standards.

SUMMARY

In accordance with one aspect, a cellular transceiver includes a first digital decimation filter with N bands. A second digital decimation filter to reject N−1 bands is coupled to the first digital decimation filter for implementing a Global System for Mobile communication mode.

Other aspects are set forth in the accompanying detailed description and claims.

DETAILED DESCRIPTION

Figure 1:
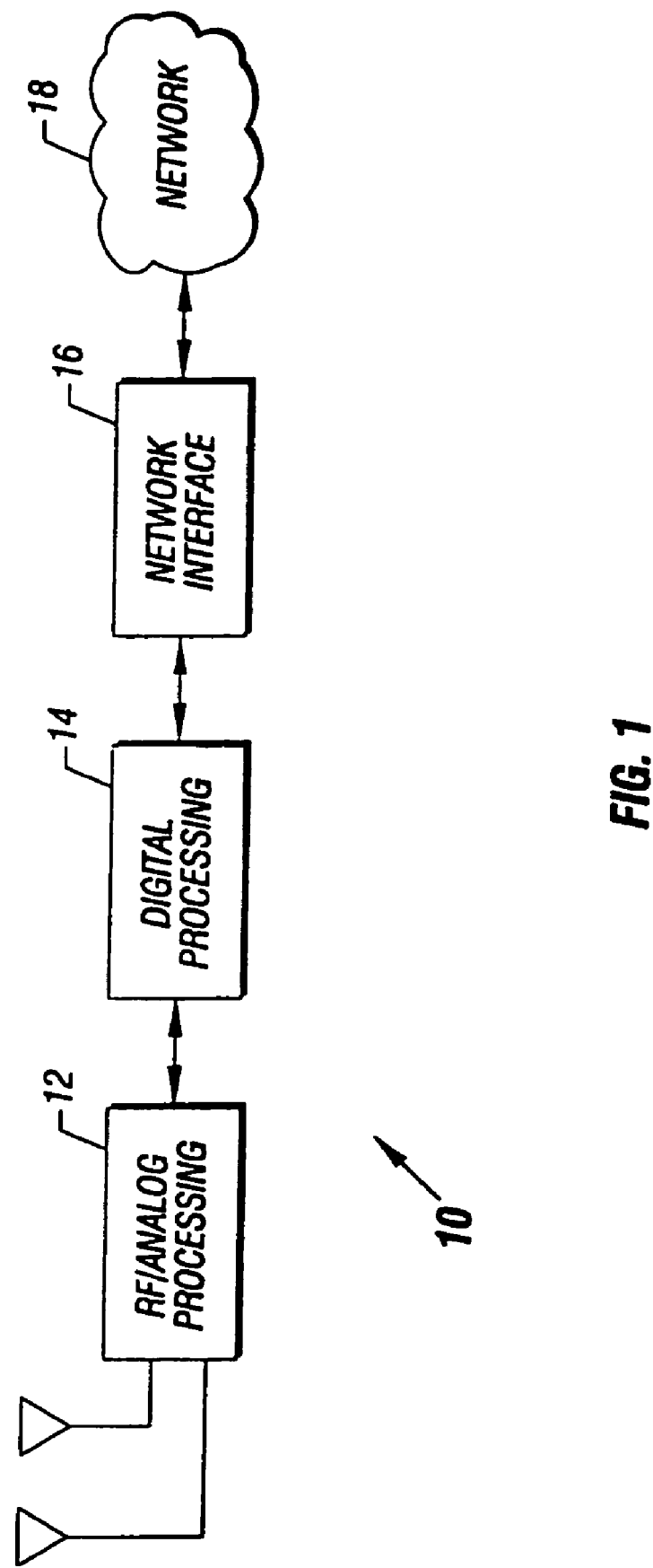
FIG. 1 is a block diagram showing one embodiment of a transceiver in accordance with the present invention.

Referring to FIG. 1, a transceiver 10 in accordance with one embodiment of the present invention includes a radio frequency/analog processing section 12 which is coupled to transmitting and receiving antennas. The analog processing section 12 is coupled to a digital processing section 14. A network interface 16 interfaces the system with a telephone network 18. In accordance with one embodiment of the present invention, the system 10 is a dual mode system that operates as a so-called W-CDMA cellular transceiver and a GSM cellular transceiver, that both receives and transmits information.

Figure 2:
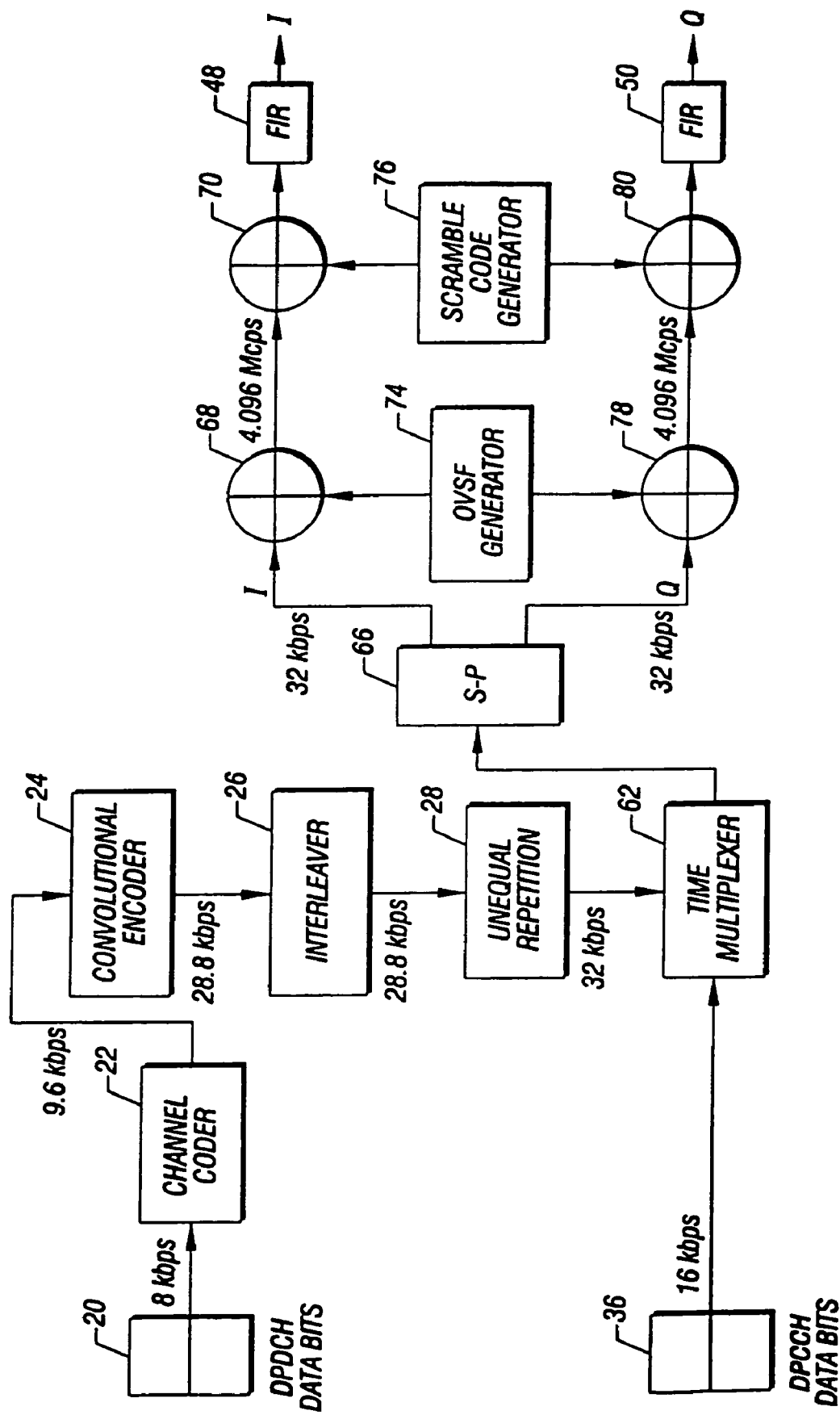
FIG. 2 is a block diagram showing a transmitter section of the transceiver shown in FIG. 1.

A W-CDMA downlink dedicated physical channel, shown in FIG. 2, receives dedicated physical data channel (DPDCH) 20 user data bits, such as voice data at eight kilobits per second. A channel coder 22 adds cyclic redundancy check (CRC) and tail bits to the data. The CRC aids in the detection of errors. The data is then passed through a one-third rate convolution encoder 24 which may triple the rate by adding redundancy. The data is interleaved in an interleaver 26. An unequal repetition stage 28 may raise the data rate, for example to 32 Kbps. The data bits are multiplexed, by a multiplexer 62, with control information from the dedicated physical control channel (DPCCH) 36 that contains control data. Control information may be pilot bits, transmit power control bits (TPC), and rate information or transmit format indicator bits (TFI).

A serial-to-parallel converter 66 converts the data and maps the data to the I and Q branches respectively. The I and Q branches are then spread to a 4.096 Mcps rate with the same orthogonal variable spreading factor (OVSF) code by the generator 74 and logic devices 68 and 78 (such as exclusive OR gates). The OVSF may have a code of 128 for example which means that the spreading code has the length of 128 chips. So for every symbol there are 128 chips (32 Kbps×128=4.096 Mcps). The OVSF code is effectively the channelization code. Next a scrambling code is applied by a generator 76, applied through logic devices (such as exclusive OR gates 70 and 80), that is unique to the local base station. The I and Q branches are filtered by filters 48 and 50 and the I and Q channels are routed for summing with other forward channel's I and Q signals prior to IQ modulation.

Figure 3:
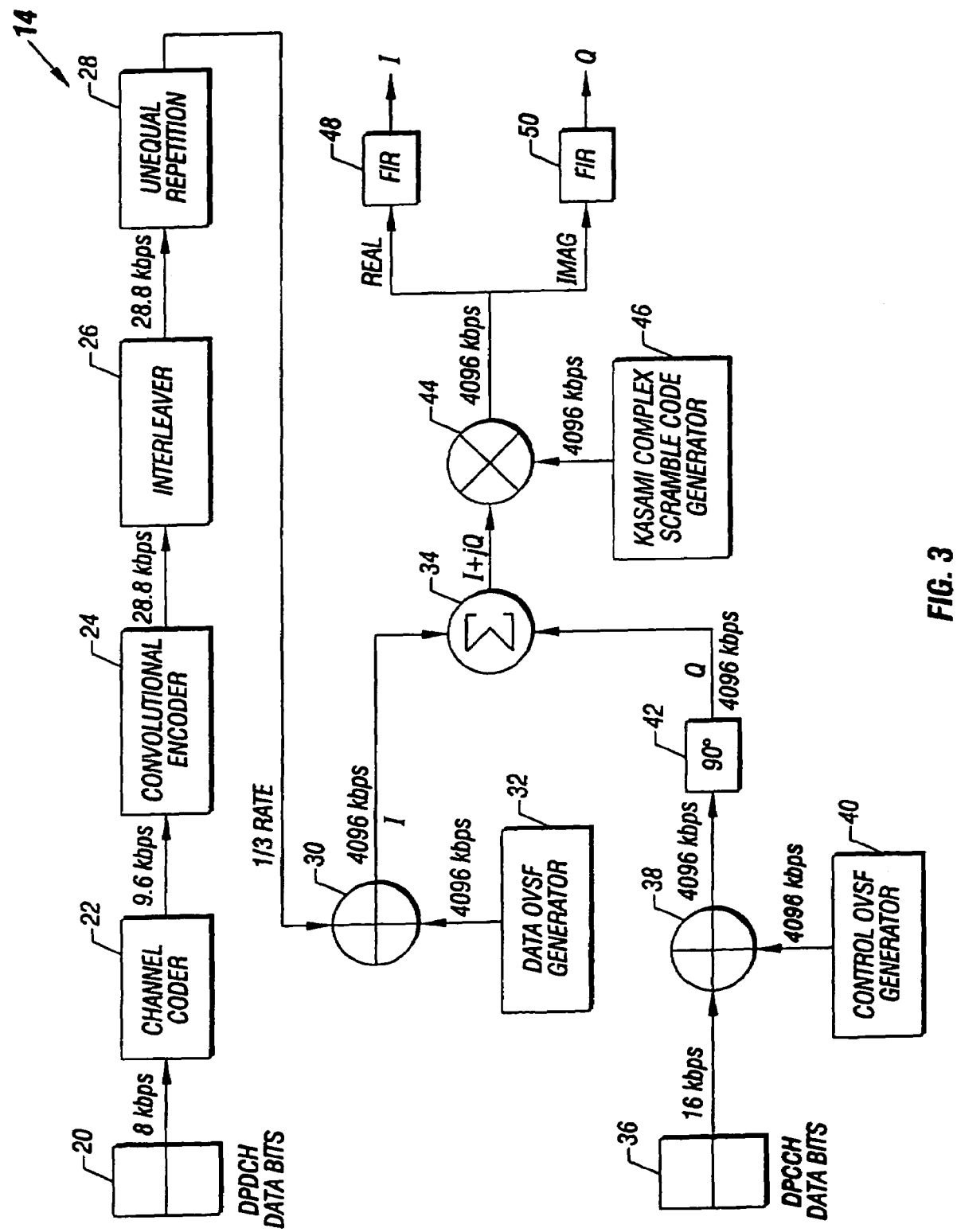
FIG. 3 is a block diagram of the uplink section of the transceiver shown in FIG. 1.

Referring next to FIG. 3, which shows the W-CDMA uplink dedicated physical channel, the 8 Kbps voice data is carried as traffic data on the DPDCH 20. Cyclic redundancy check and tail bits are added by the codec 22, convolutional encoded in an encoder 24, and interleaved (in an interleaver 26) as described in the downlink example. The data is mapped to the I branch and then spread, for example with an OVSF code with SF=128, to reach the 4.096 Mcps rate using the generator 32 and logic gate 30. The control data bits are mapped to the Q branch and also spread but with an OVSF code with SF=256, using generator 40 and logic gate 38, because the control data is at 16 Kbps. A phase shift may be supplied at 42. The branches are summed at 34 and then complex scrambled using the logic gate 44 and a generator 46.

An effective transfer function that may be used to simultaneously reduce the intersymbol interference defects and the spectral width of a modulated digital signal may use filters 48, 50 with square root transfer functions at both the transmitter and receiver. For example, the pulse shaping techniques in the ETSI and IMT-2000 standards of the 3G W-CDMA system are the square-root-raised-cosine (SRRC) filter with a roll off, α, equal to 0.22 in the frequency domain at both the receiver and transmitter.

The impulse response of a raised cosine filter is given by:

$$h_{RC}(t) = \left(\frac{\sin(\pi t/T_C)}{\pi t/T_C}\right)\left(\frac{\cos(\alpha \pi t)}{1 - (2\alpha t/T_C)^2}\right),$$

where $T_c$ is the chip duration and α is the roll off factor with α equal to or less than one and greater than or equal to zero. The raised cosine filter can be approximated using finite impulse response (FIR) filters by truncating the pulses at some multiple of $T_c$.

The corresponding transfer function of a raised cosine filter can be obtained by taking the Fourier transform of the impulse response, and is given by:

$$H_{RC}(f) = \begin{cases} T_C & 0 \le |f| \le (1-\alpha)/2T_C \\ \frac{T_C}{2}\left[1 - \sin\frac{\pi T_C}{\alpha}\left(f - \frac{1}{2T_C}\right)\right] & \frac{(1-\alpha)}{2T_C} \le |f| \le \frac{(1+\alpha)}{2T_C} \\ 0 & \text{otherwise} \end{cases}.$$

The SRRC roll off transfer function can be directly developed by using identical $[H_{RC}(f)^{1/2}]$ h filters applied at both the transmitter and receiver to provide a matched filter in a flat fading mobile channel. The transfer function of the SRRC filter in the frequency domain is as follows:

$$H_{SRRC}(f) = \begin{cases} \sqrt{T_C} & 0 \le |f| \le (1-\alpha)/2T_C \\ \sqrt{\frac{T_C}{2}\left[1 - \sin\frac{\pi T_C}{\alpha}\left(f - \frac{1}{2T_C}\right)\right]}^{1/2} & \frac{(1-\alpha)}{2T_C} \le |f| \le \frac{(1+\alpha)}{2T_C} \\ 0 & \text{otherwise} \end{cases}.$$

The corresponding impulse response of a square-root-raised-cosine filter can be obtained by taking the inverse Fourier transform of the transfer function of the SRRC filter and is given by:

$$h_{SRRC}(t) = \frac{T_C^{-1/2}}{1-(4\alpha t/T_C)^2}\left\{\frac{\sin[(1-\alpha)\pi t/T_C]}{\pi t/T_C} + \frac{4\alpha}{\pi}\cos[\pi(1+\alpha)t/T_C]\right\}.$$

The square-root-raised-cosine filter discussed so far is a continuous time filter. The square-root-raised-cosine filter may be converted from the continuous-time domain to the discrete-time domain.

A discrete-time signal is a signal defined at discrete times and thus the independent variable has discrete values. Discrete-time signals are represented as sequences of numbers.

Figure 4:
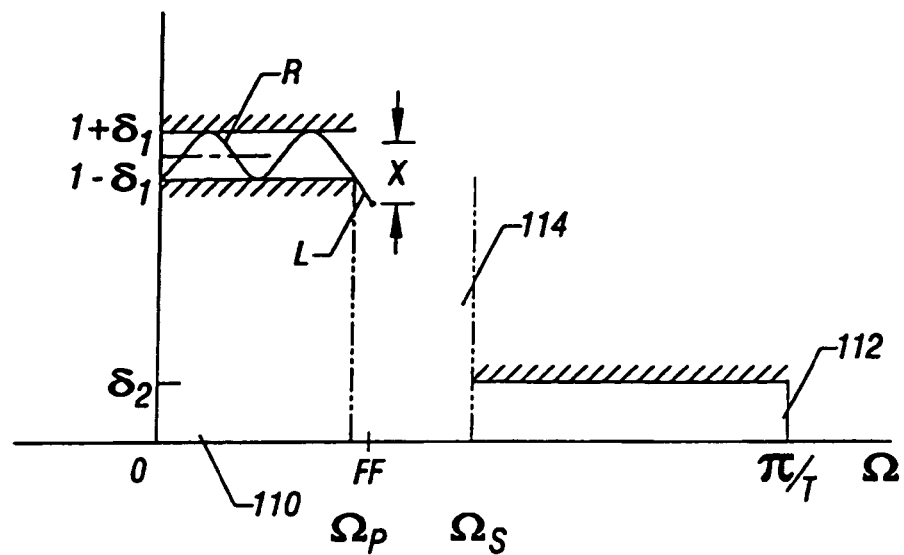
FIG. 4 is a block diagram showing one embodiment of the present invention.

The characteristics for effective frequency response of an SRRC filter in the continuous time domain are shown in FIG. 4. Specifically, the SRRC filter having the characteristics illustrated in FIG. 4 has the following properties when the sampling rate $F_s$ is at $2f_c$ (where the chip rate $f_c=1/T_c$) samples per second:

1. The gain $|H_{SRRC}(j\Omega)|$ is within $\pm\delta_1$ of unity in the frequency band $$110 \quad 0 \leq \Omega \leq 2\pi\frac{(1-\alpha)}{2T_C},$$

called the passband, where $\Omega=2\pi f$.

2. The gain is equal to $\delta_2$ in the frequency band $$112 \quad \Omega \geq \frac{(1+\alpha)}{2T_C}$$

called the stopband.

3. The passband frequency is $\Omega_p=2\pi(1-\alpha)\ 2T_c$.
4. The stopband frequency is $\Omega_s=2\pi(1+\alpha)/2T_c$.

Referring to FIG. 4, the fundamental frequency (FF) is equal to half of chip rate ($T_c/2$). Thus in an example with a chip rate of 4.096 Mcps, the fundamental frequency is 2.048 MHz. In FIG. 4, the ripple, indicated at R, has a portion L which has a value X of 3 dB below one (the normalized gain). Thus, the passband frequency 110 ($\Omega_p$) may be extended slightly into the transition band 114 to the fundamental frequency, indicated as FF in FIG. 4, so that the ripple has a value of X below the normalized gain (equal to one). With this relationship, signals within the extended passband frequencies are not clipped off. In other words, to accurately emulate the operation of an SRRC filter using FIR filter design techniques, the criteria set forth above provides an adequate passband for a filter 48, 50.

The characteristics of the filters 48, 50 are shown in FIG. 4, where the limits of the approximation error are indicated by shaded lines. The tolerance scheme for the discrete-time SRRC filter may be the same as that of a continuous time domain filter and may be expressed as a function of normalized frequency ($\omega=\Omega T$) in the frequency range $0\leq\Omega\leq\pi$, because the remainder specification can be inferred from symmetry properties. As a result, the passband where the magnitude of the frequency response is approximately unity, with an error of plus or minus $\pm\delta_1$, is:

$$(1-\delta_1)\leq|H(e^{j\omega})|\leq(1+\delta_1)|\omega|\leq\omega_p.$$

The magnitude response of the fundamental frequency at the edge of 3 dB is given by, $$|H(e^{j\omega})|=(1+\delta_{3dB})|\omega_{3dB}=0.5\pi.$$

The other approximation band is the stopband whose magnitude response is approximately zero with an error of less than $\delta_2$:

$$|H(e^{j\omega})|\leq\delta_2,\ \omega_s\leq|\omega|\leq\pi.$$

The filter may be designed using McClellan-Parks's method, also called equiripple approximations. Other techniques such as windowing may also be used. To meet the ETSI UMTS and IMT-2000 standard, a roll off factor of alpha equals 0.22, a chip rate is 4.096 Mcps and $\delta_1$ is equal to 1 dB and $\delta_2$ is equal to 40 dB. Other chip rates are also contemplated. Assuming the sampling rate $F_s=2f_c=2/T_c$ which equals 8.192Mcps, the parameters shown in FIG. 4 are:

$$\omega_p > \Omega_p T = [2\pi(1-\alpha)/2T_C](T_C/2) = \frac{\pi}{2}(1-\alpha) = 0.39\pi$$

and $\omega_{3dB}=(2\pi/2T_c)(T_c/2)=0.5\pi$ $$\omega_s < \Omega_s T = [2\pi(1+\alpha)/2T](T_C/2) = \frac{\pi}{2}(1+\alpha) = 0.61\pi.$$

Note that the stopband frequency $(1+\alpha)/2T_c$ in the continuous-time domain is exactly equal to the half of occupied bandwidth of signals. In discrete-time domain, the edge of stopband frequency is needed to adjust a little bit to ensure that the transmitted signals are within the occupied bandwidth (ob)=$f_c(1+\alpha)$. So, the edge of stopband frequency in the discrete-time SRRC filter may equal to 99% of half of the occupied bandwidth of signals.

Figure 5:
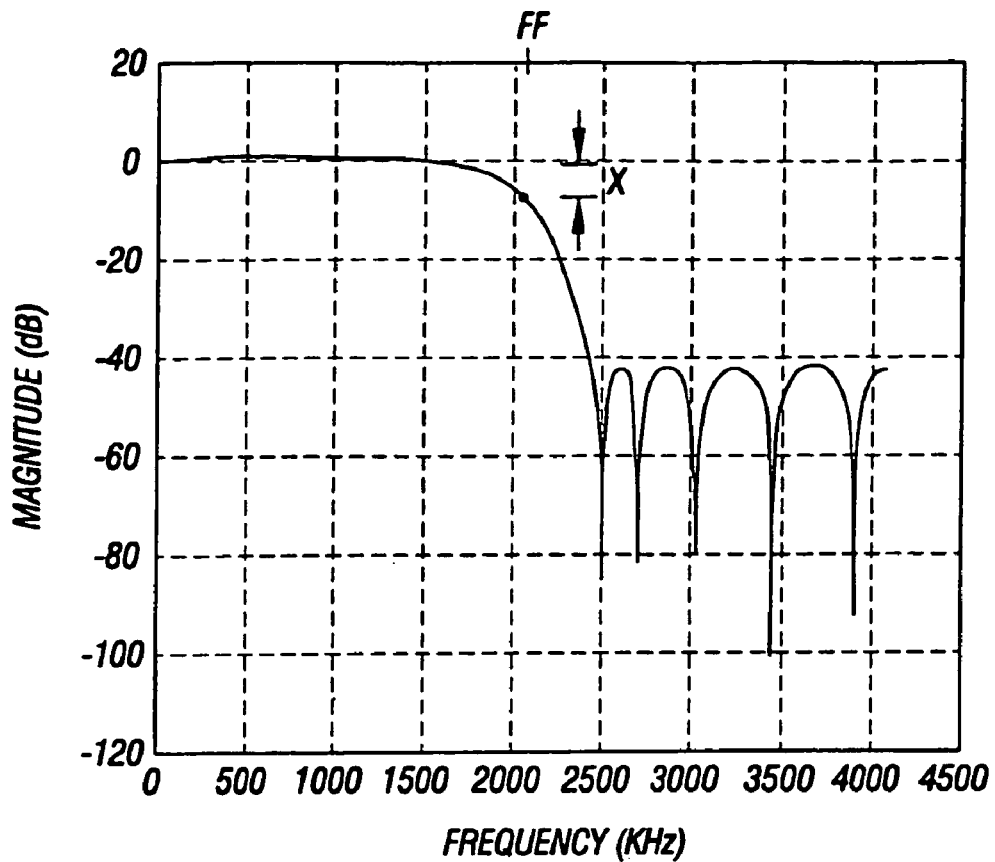
FIG. 5 is a graph of spectrum output of a SRRC filter with 40 dB in the Y-axis and frequency in the X-axis.
Figure 6:
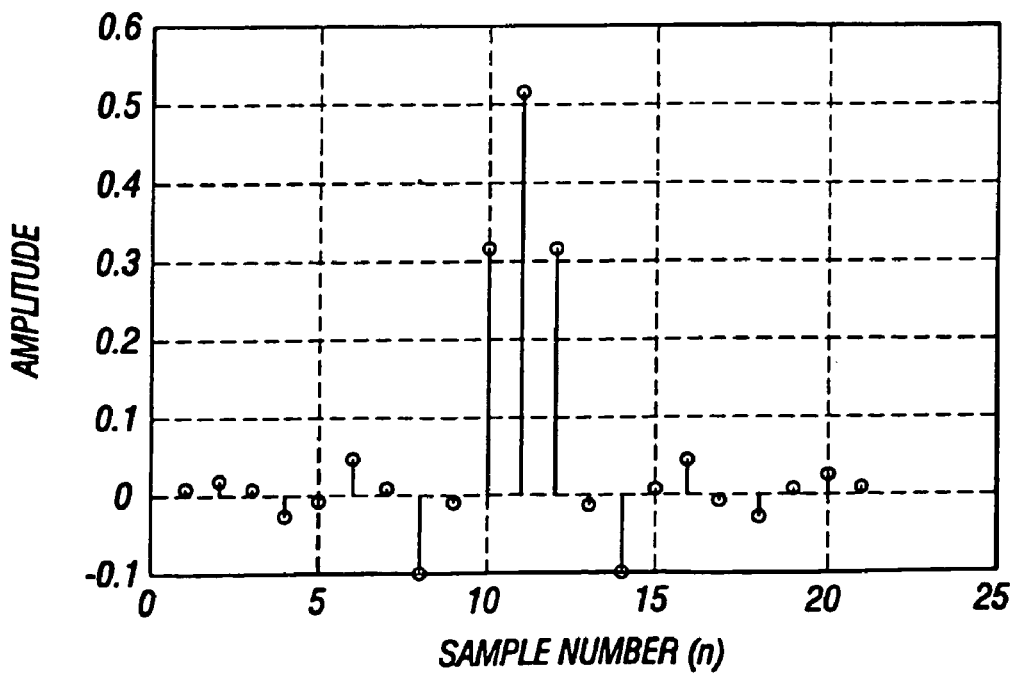
FIG. 6 is a plot of the impulse response of a discrete-time SRRC filter in accordance with one embodiment of the invention.

The spectrum output of the discrete-time SRRC filter with 40 dB in the y axis and frequency in the x axis is shown in FIG. 5. A 3 dB offset X exists at the fundamental frequency (FF), such as the fundamental frequency 2.048 for the chip rate 4.096 Mcps, as illustrated in FIG. 5. The corresponding impulse response of the discrete-time SRRC filter is plotted in FIG. 6. As shown in FIG. 6 $|C(\pm j)|\neq 0$ for j=2,4, ... ,N where N is an even integer.

Figure 6A:
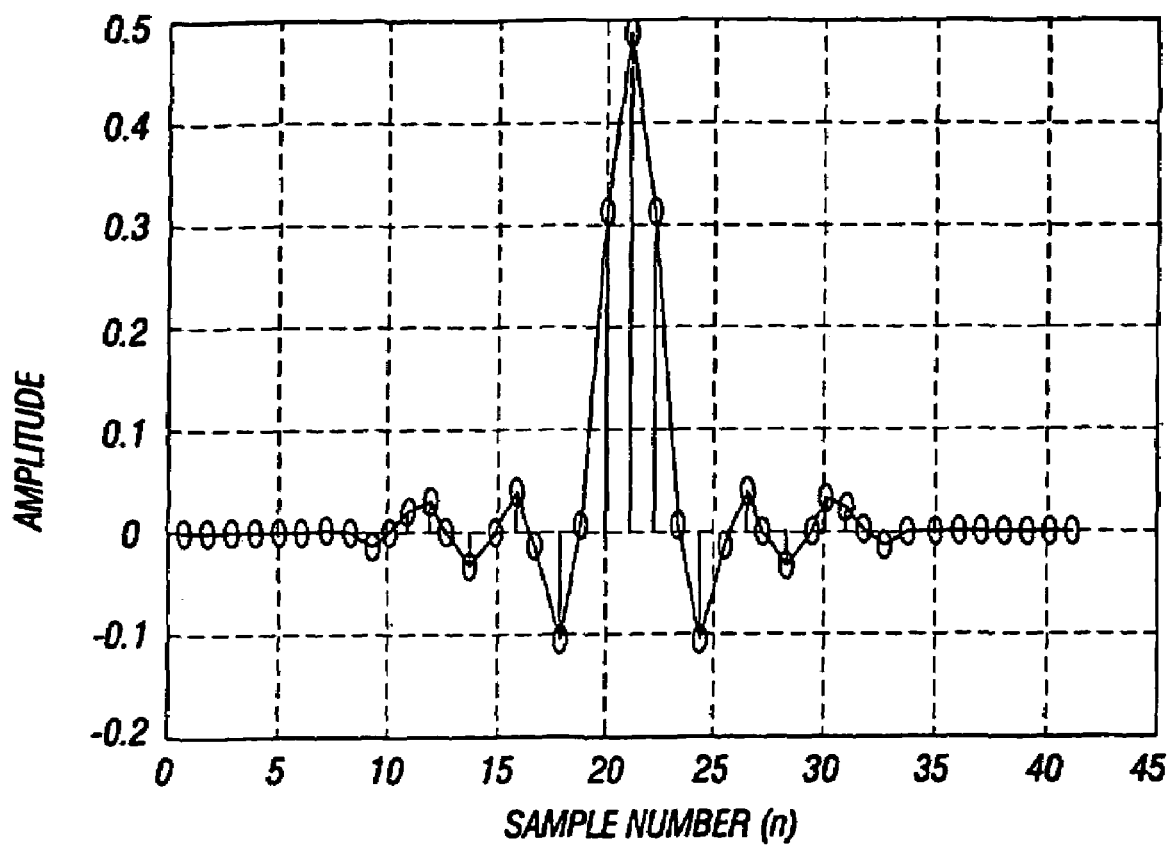
FIG. 6a is a plot of the self-convolution of the filter shown in FIG. 6.

The self-convolution of the filter is the product of transmit and receive transfer functions in the discrete time domain ($H(\omega)=H_T(\omega))H_R(\omega)$). The coefficients of the self-convolution of the filter, shown in FIG. 6a, to reduce ISI, are $|r(\pm j)|\cong 0$, for j=2,4, ... ,N where N is an even integer. A self-convolution of a function is a convolution of the function with itself. A convolution of one function with another is found by taking the product of the Fourier transforms of the two functions and inverting the results.

The filter is an odd, symmetric, discrete-time SRRC filter with 21 filter coefficients. Table 1 lists all the coefficients of the discrete-time SRRC filter with an attenuation of 40 dB:

TABLE 1

| Coefficients | Value |
| --- | --- |
| C(0) | 0.51255235431472 |
| C(−1), C(1) | 0.31568047249281 |
| C(−2), C(2) | −0.01211631945676 |
| C(−3), C(3) | −0.09848831128045 |

TABLE 1-continued

| Coefficients | Value |
| --- | --- |
| C(−4), C(4) | 0.01080637159348 |
| C(−5), C(5) | 0.05183182705160 |
| C(−6), C(6) | −0.00936393347915 |
| C(−7), C(7) | −0.03054537194965 |
| C(−8), C(8) | 0.00885487544702 |
| C(−9), C(9) | 0.02971918635933 |
| C(−10), C(10) | 0.00975086960867 |

The UTRA standard calls for a square root of mean squared error (SRMSE) of less than 17.5%. Using the coefficients set forth above, the square root of mean squared error is 9.48%, and the mean squared error is 1.8%.

Although SRRC filters have many advantages, in some applications, the desired computations involve too much power consumption and are too computationally complex for the processors that are available in a number of applications, including cellular telephones.

The output of a 21 tap FIR SRRC filter with odd symmetric coefficients can be expressed as:

$$y[n] = \sum_{k=0}^{20} C[n]x[n-k],$$

and may be expanded to be:

$$y[n] = \sum_{k=0}^{9} C[k]x[n-k] + C[10]x[n-10] + \sum_{k=0}^{9} C[20-k]x[n-20+k].$$

Because of the symmetrical relationship of the filter coefficients, the above equation can be reduced to the following:

$$y[n] = \sum_{k=0}^{9} C[k](x[n-k] + x[n-20+k]) + C[10]x[n-10].$$

Figure 7:
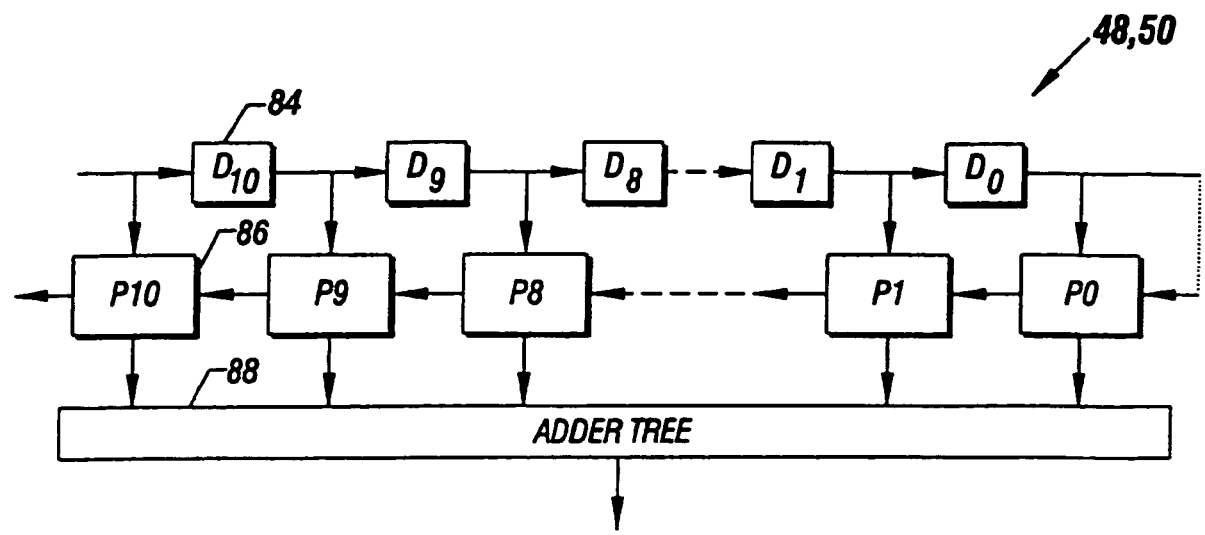
FIG. 7 is a block diagram for the implementation components of digital SRRC filter using a serial input single clock output cellular array shown in FIG. 4.

A discrete-time SRRC filter 48, 50, shown in FIG. 7, may include a plurality of delay stages 84, a plurality of processing units 86 and an adder tree 88. The filter may be designed to reduce the number of multiply-accumulate (MAC) operations and additions by exploiting the principles of data parallelism to implement an architecture with reduced computational complexity and reduced power consumption.

Figure 8:
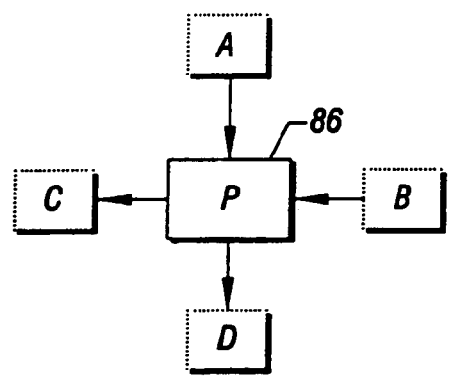
FIG. 8 is a block diagram of the processing units with inputs and outputs.

The filter coefficients C may be stored in the processing units 86 in appropriate registers therein. Each unit 86 may have two inputs, indicated as A and B, in FIG. 8, and two outputs indicated as C and D, in accordance with one embodiment of the invention.

Each processing element 86 executes the following equation:

$$D=(A+B)*K.$$

where K is the filter coefficient stored in the processing element 86. The output C is the input signal B passed through after one clock cycle delay. A and B are the input signals x(p) and x(20−p) for any integer p. As a result, the output signal from every processing unit 86 executes the term:

$$C[j](x[n-j]+x[n-20+j]) \text{ for } j=0,1,2,\ldots 9.$$

Summation of all these outputs from the basic processing elements 86 results in the output y(n). The outputs of the first twenty clock cycles are ignored. The result y(O) is produced in the twenty first clock cycle, y(1) is produced in the twenty second clock cycle and hence each filtered output is produced at each clock cycle thereafter. As a result, one hundred percent throughput may be achieved in one embodiment of the invention.

Figure 9:
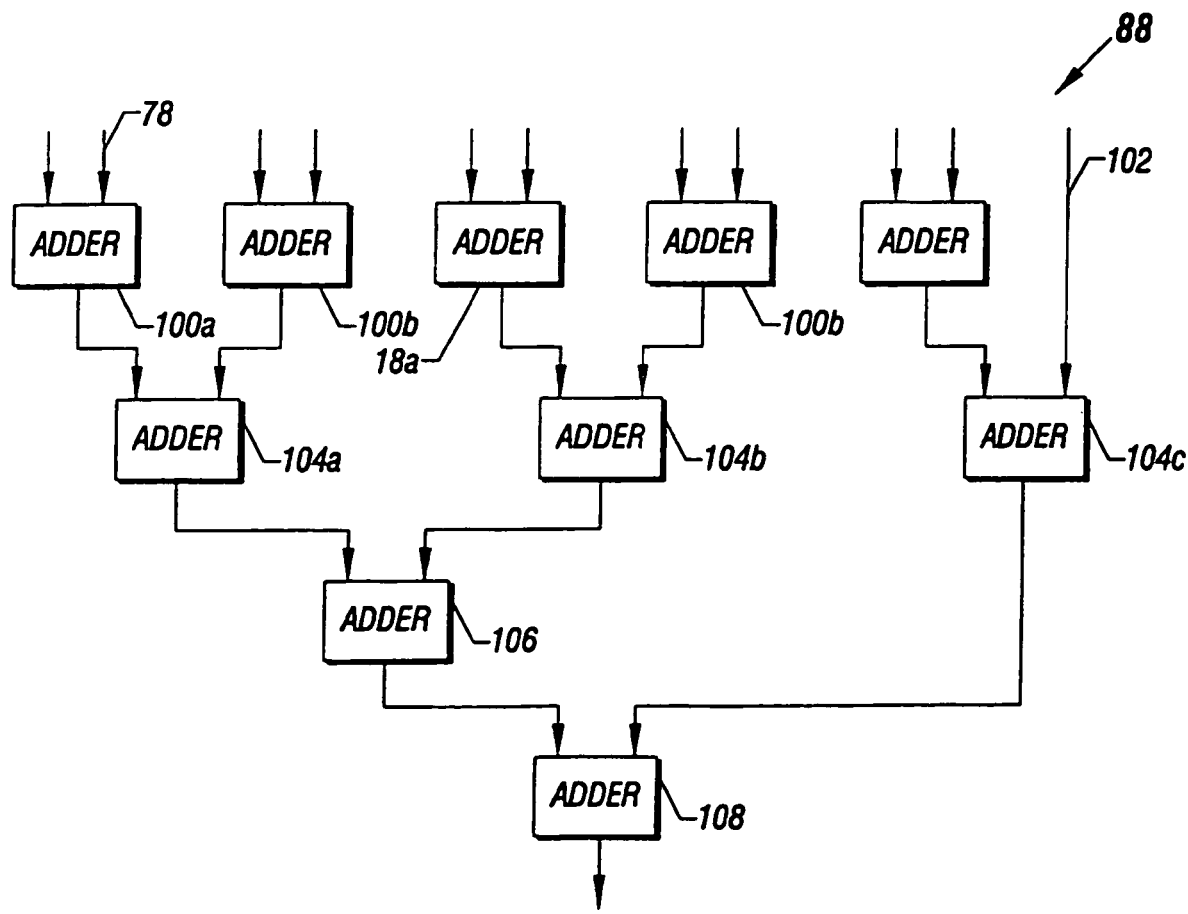
FIG. 9 is a block diagram of the adder tree shown in FIG. 7.

Referring to FIG. 9, the adder tree 88 may include adders 100a and 100b for each adjacent pair of processing units 86. The output 102 from the =processing unit $P_0$ is passed directly to the second tier adder 104c. Similarly, the outputs from the adders 100 in the first tier of adders are passed to adders 104a and 104b in the second tier of adders. A third tier of adders 106 receive the outputs from pairs of second tier adders 104 and pass through its output to a fourth tier adder 108.

Figure 10:
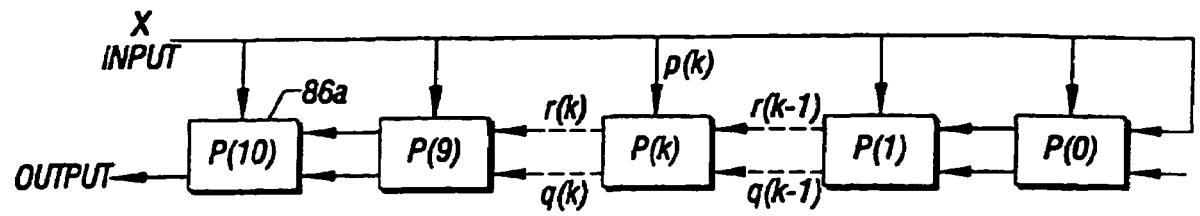
FIG. 10 is a block diagram showing another embodiment of the present invention.

In accordance with another embodiment of the present invention, shown in FIG. 10, instead of using the adder tree 88 to add all the outputs from the processing elements 86, a systolic architecture is implemented wherein the products may be accumulated using an adder inside each processing element 86a. A systolic architecture uses multiple interconnected processors, each processor doing the same operation, at a different stage of a unitary operation. In this way, the output signal may be generated for each input clock signal.

Each processing element 86a has three input signals. The input signal p(k) is a broadcast input signal and r(k−1) and q(k−1) are the two inputs coming from the previous processing element P(k−1). Two output signals r(k) and q(k) go to the input ports of the following processing element P(k+1).

Figure 11:
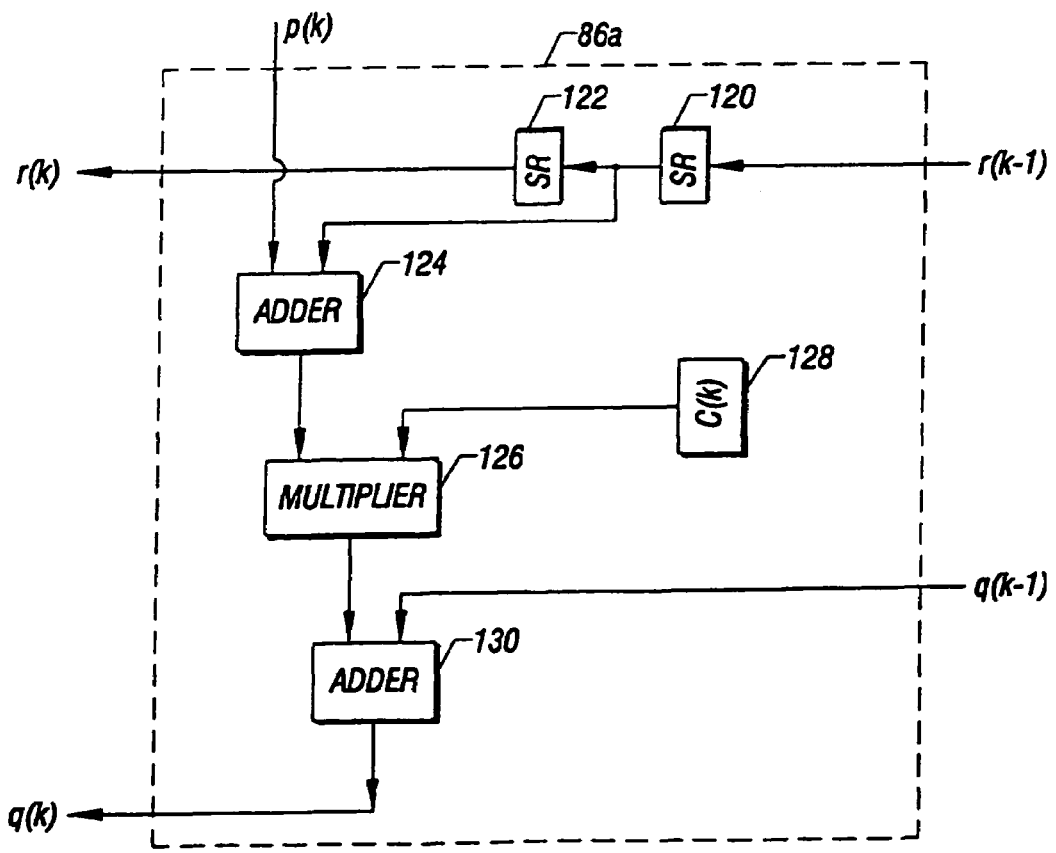
FIG. 11 is a more detailed block diagram showing one of the processing units shown in FIG. 10 in accordance with one embodiment of the present invention

The logic circuitry for each processing element 86a is shown in FIG. 11, in one embodiment of the invention. Basically, the output r(k) of the processing element P(k) is the input signal r(k−1) which is passed through to the output of the processing element 86a after two clock delays. The clock delays may be provided by delay elements 120 and 122 which may be shift registers in one example. A register 128 in the processing element 86a can be programmed to initialize with the corresponding filter coefficient C(k). The output q(k) is the accumulated result q(k−1)+[p(k)+r(k−1)]*C(k). The adder 124 adds the broadcast input p(k) plus the input signal r(k−1) after having been subjected to a single delay by a delay element 120. The result of that addition is then multiplied in a multiplier 126 times the coefficient C(k) contained in the register 128. The result of the multiplication is then added to the input signal q(k−1) in the adder 130 to produce an output q(k). If the delay resulting from the processing by adders 124, 130 and multiplier 126 matches the delay provided by the delay element 122, no additional synchronization may be required. However, in some embodiments, additional clocking may be provided if desired.

To implement a dual mode GSM and W-CDMA cellular transceiver, the same anti-aliasing analog filter and analog to digital conversion in the RF/analog processing section 12 may be used for both modes on the same platform.

For a W-CDMA system, the anti-aliasing analog filter has a frequency passband of 2.5 MHz and a frequency stopband of 5 MHz. Therefore, the narrow band of a multi-rate digital filter bank is used in the GSM mode to remove out-of-band quantization noise and to reject adjacent channel interference.

Figure 12:
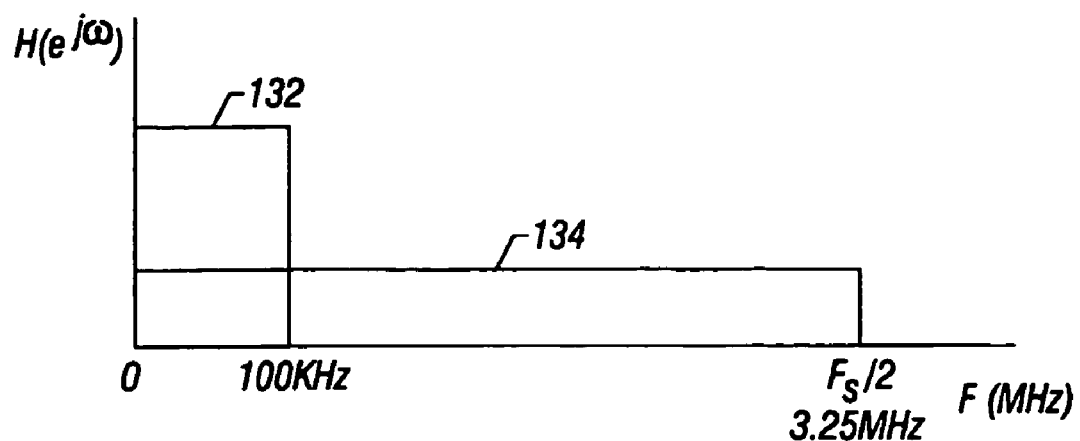
FIG. 12 is a plot of magnitude versus frequency for a decimation digital filter using the equiripple method in accordance with one embodiment of the present invention.

The sampling rate of the analog to digital conversion with 10-bit resolution in a W-CDMA system is 6.5 MHz, which is twenty-four times oversampling for a GSM system. Generally, the dynamic range of A/D conversion has 3 dB due to doubling the oversampling ratio and 6 dB per additional bit of quantizer resolution. In a GSM mode, the resolution of A/D conversion rises approximately 96 dB. A typical GSM decimation digital filter has a plus or minus 0.05 decibel passband 132 from zero to 70 kHz, −3 decibel passband 134 at 96 kHz and a stopband 136 with attenuation of −55 decibels at 135.4166 kHz, as shown in FIG. 12. This is a narrow band decimation digital filter. The decimation digital filter removes the out-of-band quantization noise in the region 134 that appears due to analog to digital conversion with the twenty-four times over sampling rate. In addition, the decimation digital filter may also perform system level filtering while rejecting adjacent channel interference.

Figure 13:
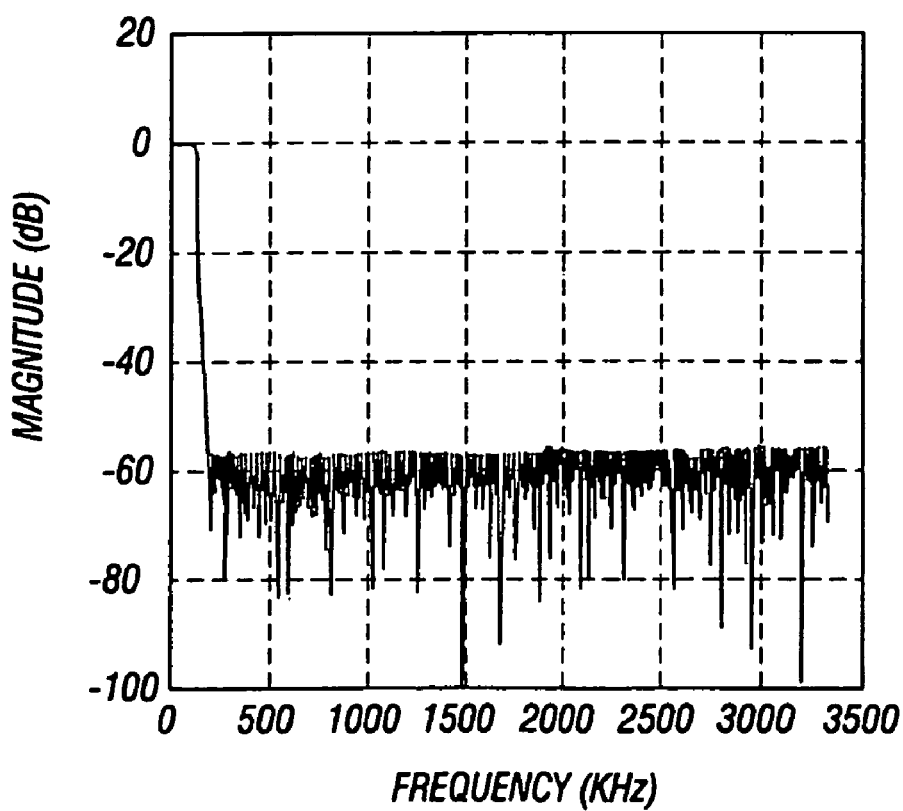
FIG. 13 is a plot of spectrum output of a decimation digital filter using the equiripple method.

A direct design of a GSM/W-CDMA filter using the equiripple method would need 288 filter coefficients, as indicated by FIG. 13. The decimation digital filter with 288 coefficients may result in numerical inaccuracies and convergence difficulties. Moreover, the computational complexities are very high for any type of semiconductor implementation or for a general purpose digital signal processor (DSP) implementation. Such a digital decimation filter basically needs 144 multiplications and 288 additions even with symmetrical taps.

Figure 14:
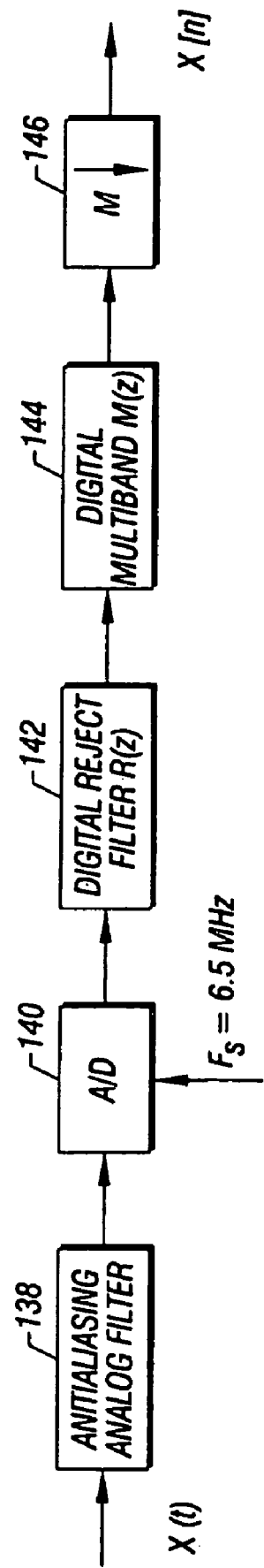
FIG. 14 is a block diagram of a multi-band approach for a multi-rate digital decimation filter for GSM operation in accordance with one embodiment of the present invention.

To reduce the number of taps, an efficient multi-band design of a multi-rate digital decimation filter may be utilized, as shown in FIG. 14. Two cascaded digital decimation filters 142, 144 substitute for one narrow band digital decimation filter in conventional designs. The digital filter M(z) 144 is called a multi-band digital decimation filter with N bands and the digital filter R(z) 142 is used to reject the N−1 multi-band of the system. The output of the two cascaded digital decimation filters 142, 144 may be the same as the output from the narrow band digital decimation filter of conventional designs.

Figure 15:
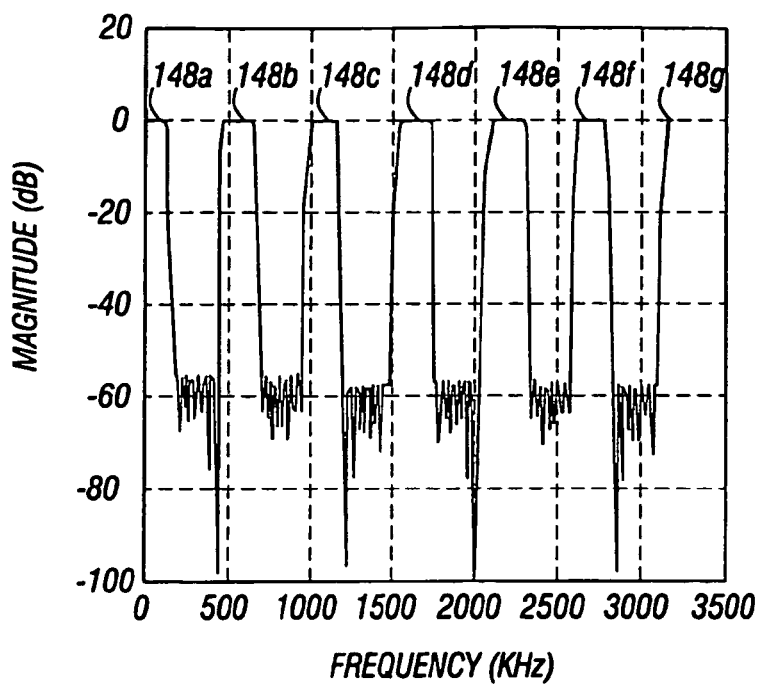
FIG. 15 is a plot of the spectrum output of a multi-band digital decimation filter in accordance with one embodiment of the present invention.

The spectrum output of the multi-band digital decimation filter, shown in FIG. 15, has seven multi-bands 148. The specification of each band 148 in this multi-band digital decimation filter is the same as the specification of the narrow band digital decimation filter. As a result, the multi-band digital decimation filter may use only twenty-seven taps with symmetry.

Thus, the typical 288 tap filter may be reduced to a twenty-seven tap filter 144. This is a result of the fact that in between two non-zero coefficients in the 27 tap design, there are eleven zeros as set forth in the Table 2 below. There are only 27 non-zero filter coefficients in the 288 coefficient filter and the other coefficients being zeros. Hence, the zeros may be avoided, and the 288 tap filter may be reduced to a 27 tap symmetric filter. In other words, the multi-band digital decimation filter 144 needs fourteen multiplications and twenty-seven additions for computation of each filtered output. The coefficients for such a multi-band digital decimation filter are set forth in Table 2 below:

TABLE 2

| Number | Coefficients |
|---|---|
| 1 | 0.00018565830266 |
| 2 | 0.00300356795316 |

TABLE 2-continued

| Number | Coefficients |
|---|---|
| 3 | 0.00237399652784 |
| 4 | −0.00483282898215 |
| 5 | −0.01120586425334 |
| 6 | −0.00157338229331 |
| 7 | 0.02137457721271 |
| 8 | 0.02528882246583 |
| 9 | −0.01520093711254 |
| 10 | −0.06511480084641 |
| 11 | −0.03945039688321 |
| 12 | 0.10454401293526 |
| 13 | 0.29192296620588 |
| 14 | 0.37881846028794 |
| 15 | 0.29192296620588 |
| 16 | 0.10454401293526 |
| 17 | −0.03945039688321 |
| 18 | −0.06511480084641 |
| 19 | −0.01520093711254 |
| 20 | 0.02528882246583 |
| 21 | 0.02137457721271 |
| 22 | −0.00157338229331 |
| 23 | −0.01120586425334 |
| 24 | −0.00483282898215 |
| 25 | 0.00237399652784 |
| 26 | 0.00300356795316 |
| 27 | 0.00018565830266 |

Figure 16:
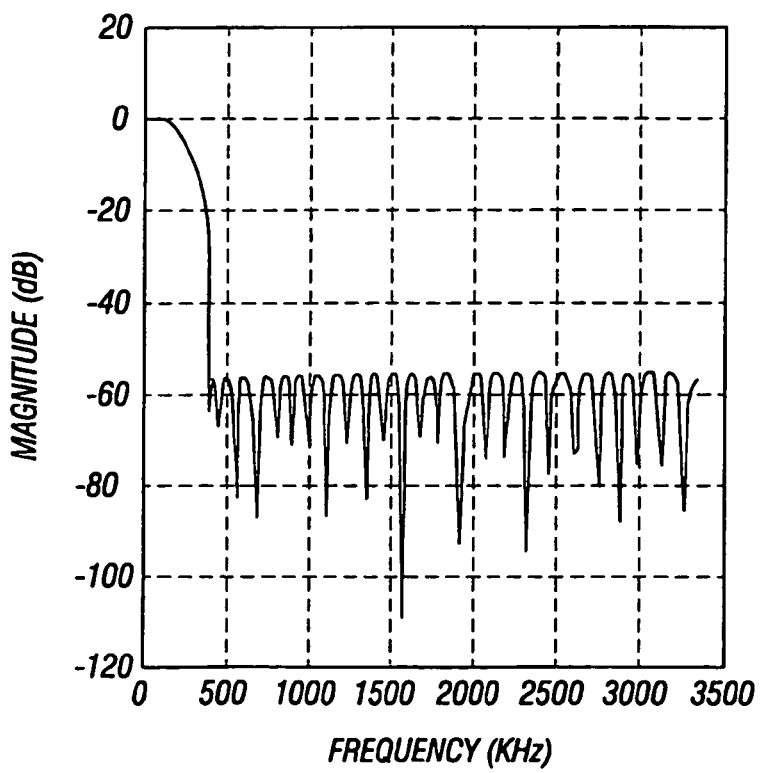
FIG. 16 is a plot of spectrum output of a digital decimation rejection filter in accordance with one embodiment of the present invention.

The digital filter R(z) 142 rejects six multi-bands 148$b$-$g$ as shown in FIG. 15 since only the leftmost band 148$a$ in the multi-band digital decimation filter is of interest. This filter function R(z), shown in FIG. 16, is called a digital decimation rejection filter. The passband and the stopband frequency in the digital decimation filter R(z) is 90 kHz and 406.25 kHz, respectively in one embodiment of the invention. This digital decimation rejection filter R(z) 142 has fifty-three taps with symmetry. Thus, the computational complexities of the filter R(z) are twenty-seven multiplications and fifty-three additions. Table 3 shows the coefficients of the digital decimation rejection filter R(z).

TABLE 3

| Number | Coefficients |
|---|---|
| 1 | −0.00137558232374 |
| 2 | −0.00154165914402 |
| 3 | −0.00227674969551 |
| 4 | −0.00311436662515 |
| 5 | −0.00399975354214 |
| 6 | −0.00485431024691 |
| 7 | −0.00557663397887 |
| 8 | −0.00604645636938 |
| 9 | −0.00613177945903 |
| 10 | −0.00569547280036 |
| 11 | −0.00460731169162 |
| 12 | −0.00275139448363 |
| 13 | −0.00004044073588 |
| 14 | 0.00357381257229 |
| 15 | 0.00809346629595 |
| 16 | 0.01346764191367 |
| 17 | 0.01959047821346 |
| 18 | 0.02630020735428 |
| 19 | 0.03338571928125 |
| 20 | 0.04059742930994 |
| 21 | 0.04765581448452 |
| 22 | 0.05426859329593 |
| 23 | 0.06015228456753 |
| 24 | 0.06503893184285 |
| 25 | 0.06870546907091 |
| 26 | 0.07097747975138 |
| 27 | 0.07174720528706 |
| 28 | 0.07097747975138 |
| 29 | 0.06870546907091 |

TABLE 3-continued

| Number | Coefficients |
|---|---|
| 30 | 0.06503893184285 |
| 31 | 0.06015228456753 |
| 32 | 0.05426859329593 |
| 33 | 0.04765581448452 |
| 34 | 0.04059742930994 |
| 35 | 0.03338571928125 |
| 36 | 0.02630020735428 |
| 37 | 0.01959047821346 |
| 38 | 0.01346764191367 |
| 39 | 0.00809346629595 |
| 40 | 0.00357381257229 |
| 41 | −0.00004044073588 |
| 42 | −0.00275139448363 |
| 43 | −0.00460731169162 |
| 44 | −0.00569547280036 |
| 45 | −0.00613177945903 |
| 46 | −0.00604645636938 |
| 47 | −0.00557663397887 |
| 48 | −0.00485431024691 |
| 49 | −0.00399975354214 |
| 50 | −0.00311436662515 |
| 51 | −0.00227674969551 |
| 52 | −0.00154165914402 |
| 53 | −0.00137558232374 |

Figure 17:
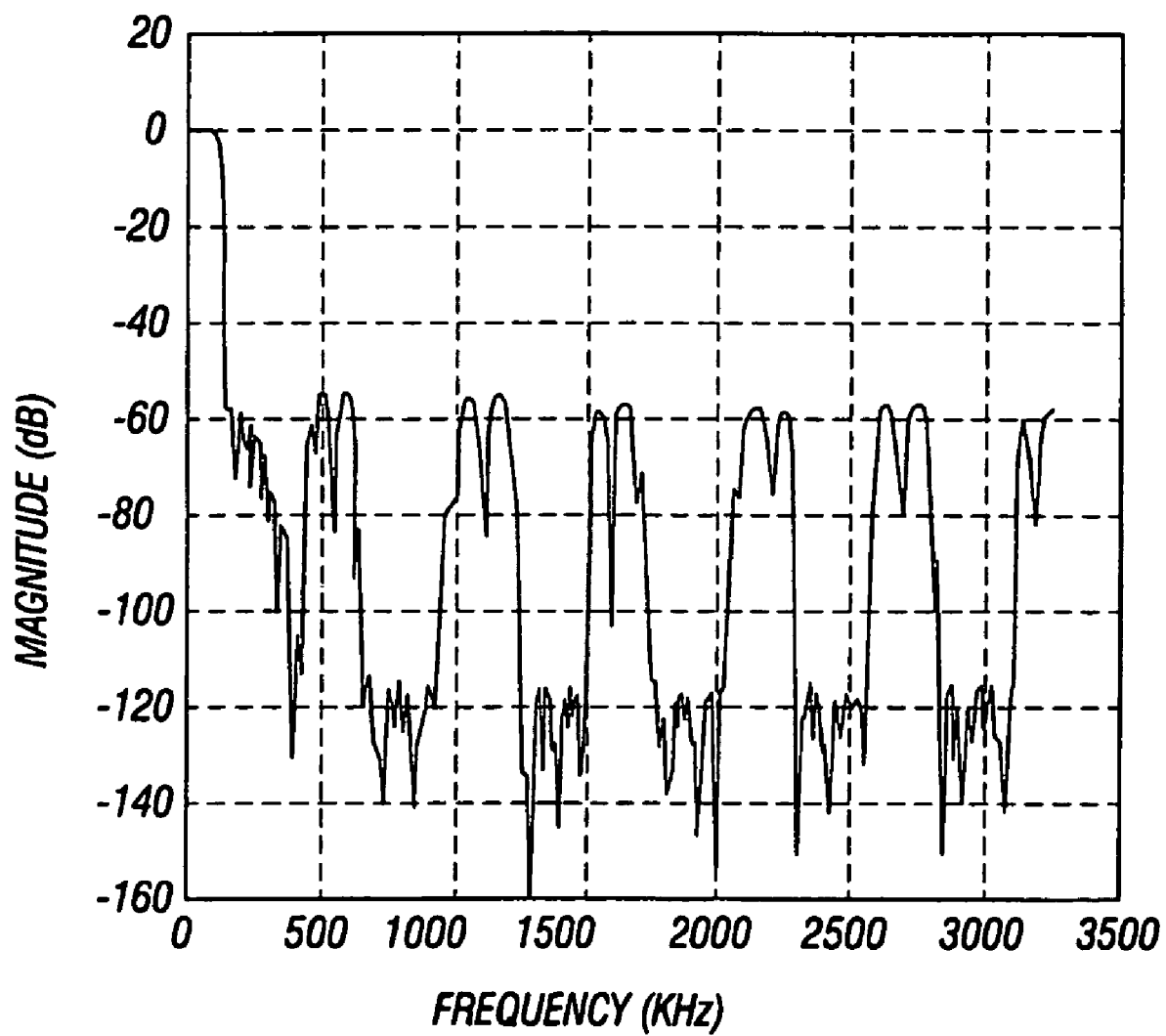
FIG. 17 is a plot of spectrum output of a combined multi-band filter M(z) and a rejection filter R(z) in accordance with one embodiment of the present invention.

The two cascaded digital decimation filters R(z) and M(z), shown in FIG. 17, results in fifty-five decibels of attenuation. The spectrum output is the same as the spectrum output from a narrow band digital decimation filter except for the frequency band from the stopband to 3500 kHz ($F_s/2$=3500 kHz). As a result, the multi-band approach of two cascaded filters 142, 144 can save more than 71% of the multiplications and additions compared to the direct design.

The output from the first filter R(z) 142 is rearranged before it goes to the input of the second filter M(z) 144 to account for the eleven zeros between two effective non-zero filter coefficients. This may be achieved by rearranging the output from the R(z) filter 142 such that only every twelfth datum is provided to the M(z) filter 144. For example, assume that the output from R(z) is represented by the sequence y(0), y(1), y(2), . . . , y(287), y(288), y(289), y(290), . . . Assume that the output from the filter M(z) is represented by z(0), z(1), z(2), . . . . For the first filter output z(0) from the filter M(z), the input sequence from to M(z) is y(0), y(12), y(24), y(36), . . . , y(288). For the second filter output z(1) from the filter M(z), the input sequence to the filter M(z) is y(1), y(13), y(25), y(37), . . . , y(289). Similarly, for the third filter output z(2), the input sequence is y(2), y(14), y(26), y(38), . . . , y(290) and so on.

This effect may be achieved by inserting a memory or buffer between the R(z) and M(z) filters so that the output data from R(z) is first stored in a memory in the necessary order. Hence the data ordering in the memory module may be y(0), y(12), y(24), . . . , y(288), y(1), y(13), y(25), y(37), . . . , y(289), y(2), y(14), y(26), . . . , y(290), . . . .

A programmable tap filter may be used for both R(z) and M(z) filters 142, 144 in one embodiment of the present invention. The architecture of such a programmable filter is described later.

Figure 18:
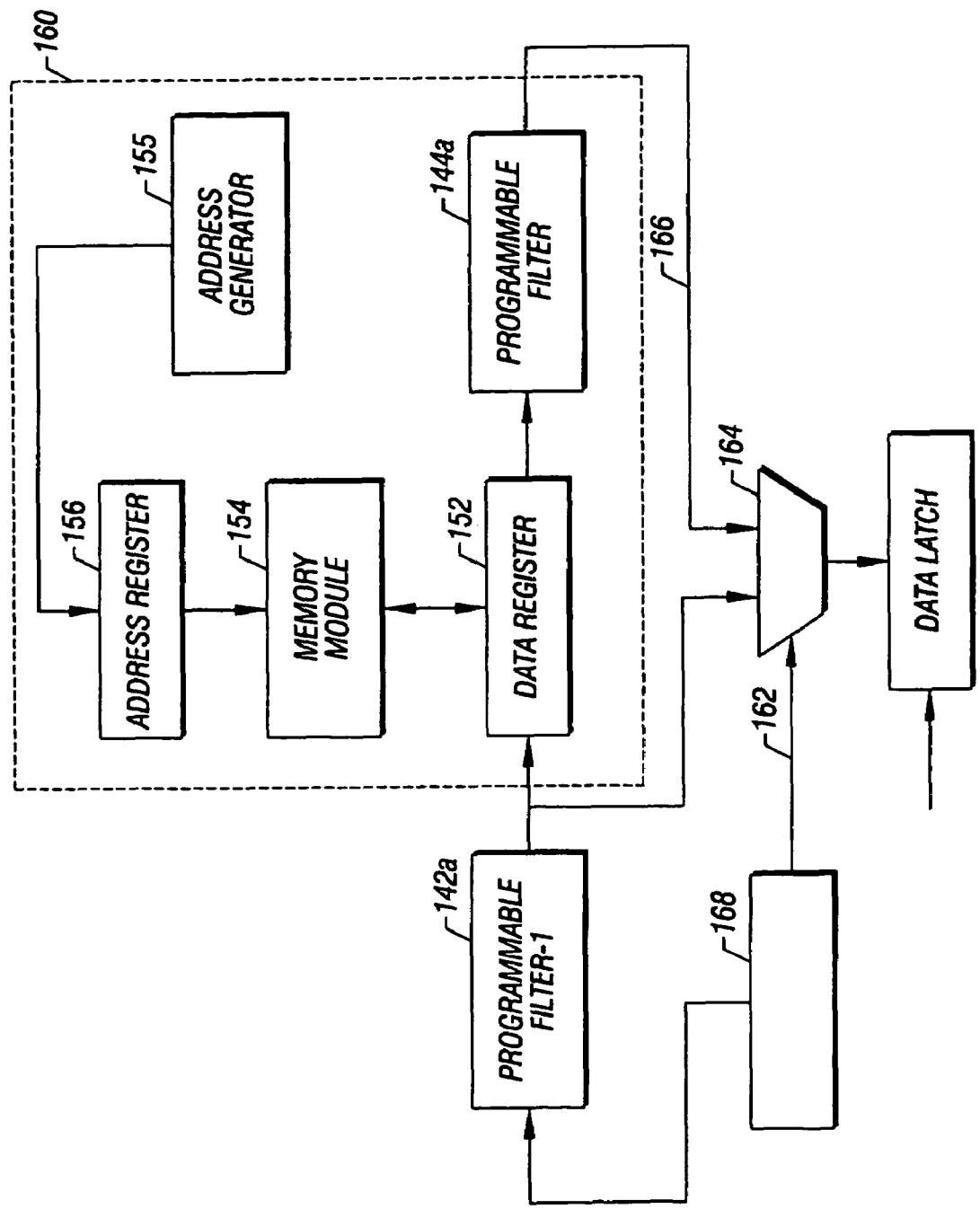
FIG. 18 is a block diagram in accordance with one embodiment of the present invention.

Thus, referring to FIG. 18, the filter 150 includes a first programmable filter 142a and a second programmable filter 144a. An address generator 158 drives an address register 156 which in turn controls a memory module 154. The memory module communicates with a data register 152 to provide the string of data described above.

In the W-CDMA mode, the circuitry 160 is disabled, or put into the low power mode and the selection line 162 of the multiplexer 164 selects the output from the filter 142a to go to the data latch 165. Since both filters 142a and 144a are programmable, the filter 142a may be programmed so that it implements the desired SRRC filter using the required number of taps. As described previously, the W-CDMA function may be implemented using a twenty-one tap symmetric filter. The selection line 162 comes from a software controlled register 168, which also sets the number of taps for the filter 142a.

In the GSM mode, the circuitry 160 is enabled and the output of the multiplexer 164 is selected from filter 144a. The address generator circuitry 158 generates addresses in the particular fashion explained above so that the output from the filter 142a is stored in contiguous memory locations as y(0), (y12), y(24), . . . , y(288), y(1), y(13), y(25), y(37), . . . , y(289), y(2), y(14), y(26), . . . , y(290), . . . The same circuitry is used to read data from the memory in contiguous fashion in order to feed filter 144a to generate the GSM output 166.

Because the filters 142a, 144a are programmable, in one embodiment of the present invention, the filter 142a may selectively provide the number of taps (53) used for the first phase of GSM filtering or the number of taps (21) for W-CDMA filtering. When a W-CDMA signal is recognized, software controls the register 168 to set the proper number of taps in the filter 142a and to select the appropriate multiplexer 164 output.

Figure 19:
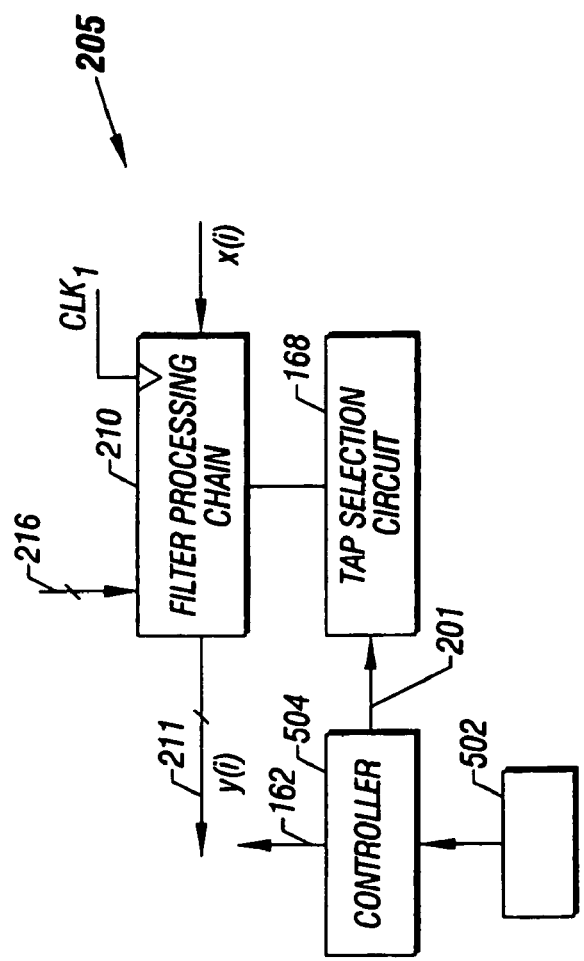
FIG. 19 is a schematic diagram of a digital filter system according to an embodiment of the invention.

Referring to FIG. 19, a programmable FIR filter 142a, 144a includes a systolic processing chain 210 that has a selectable number of taps. The number of taps may be selected by a programmable tap selection circuit 168 that is coupled to the processing chain 210.

Figure 20:
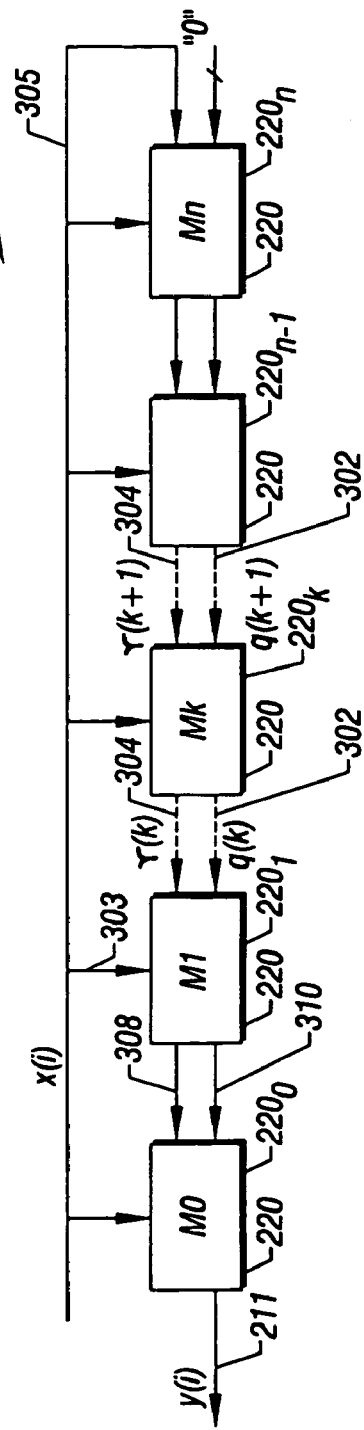
FIG. 20 is a schematic diagram of the processing chain of FIG. 19 according to an embodiment of the invention.

Referring to FIG. 20, in some embodiments, these multiplications may be performed by N+1 processing units 220 (processing units $220_0$, $220_1$, . . . , $220_k$, . . . $220_{n-1}$, $220_n$, as examples) of the chain 210, each of which exploits the symmetric property of the filter by multiplying a different C(j) coefficient by the appropriate pair of input values. As further described below, the processing units 220 form a systolic architecture, an architecture in which all of the processing units 220 are producing products on each clock cycle of the $CLK_1$ signal so that the chain 210 produces a different output value on each clock cycle.

More particularly, the processing units 220 are serially coupled together to form a serial chain for forming the output values, a chain in which the processing occurs from the processing unit 220n to the processing unit $220_0$. Each processing unit 220 is associated with a different filter coefficient (i.e., each processing unit 220 is associated with two taps of the filter) and generates a corresponding product for each output value. In this manner, each processing unit 220 receives an indication (via accumulation input lines 302) of an ongoing sum from the predecessor processing unit 220 (except for the first processing unit 220n) in the chain 210, updates the ongoing sum with an additional product and furnishes an indication of the ongoing sum (via accumulation output lines 310) to the successor processing unit 220 (except for the last processing unit $220_0$) in the chain 210.

Figure 21:
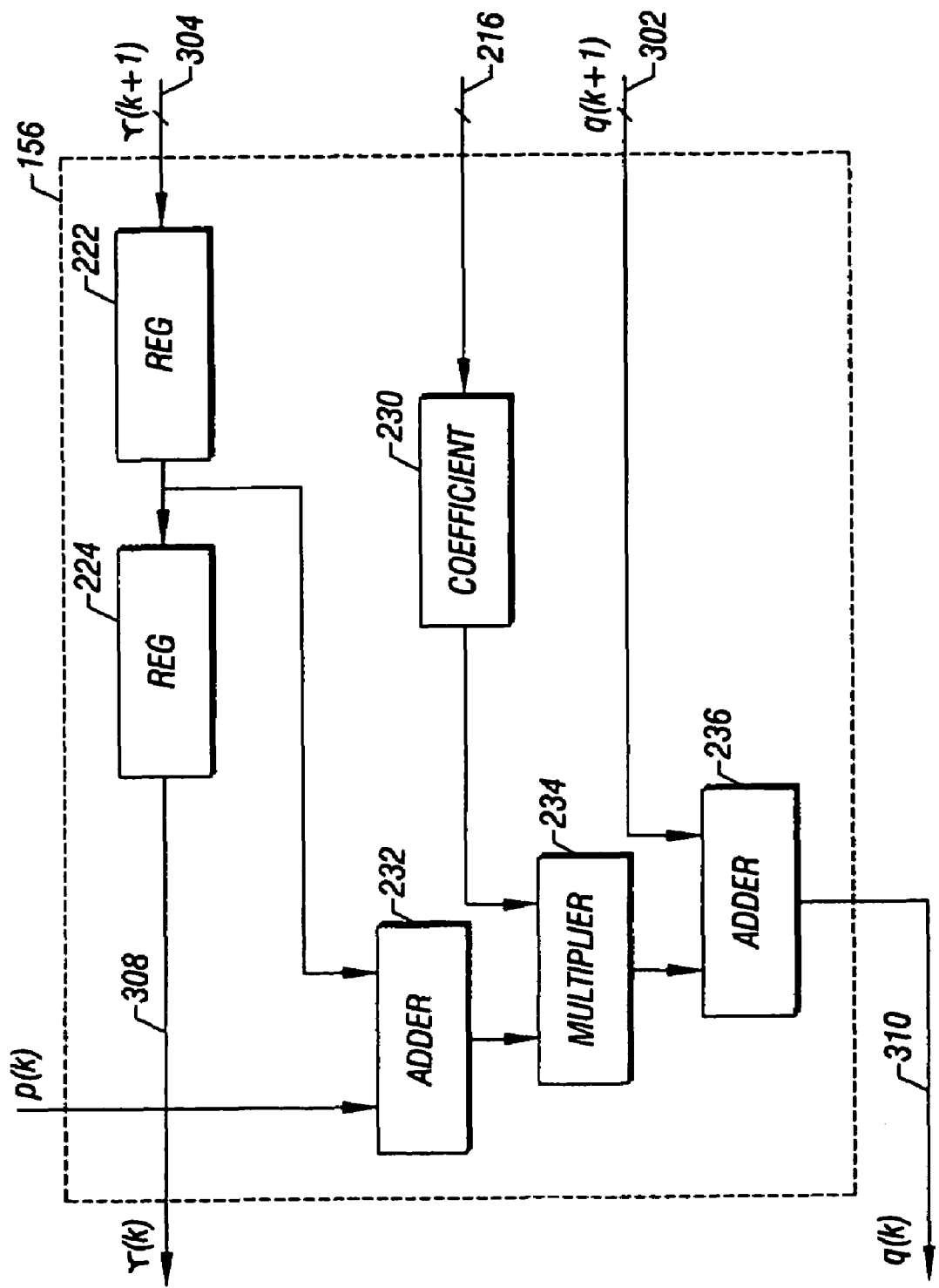
FIG. 21 is a schematic diagram of a processing unit of the chain of FIG. 20 according to an embodiment of the invention.

Referring to FIG. 21, as an example, a particular processing unit 220k receives three input signals that indicate three respective values: p(k), the broadcast input value (from a broadcast input line 405) that is equivalent to some x value; r (k+1), a delayed input value indicated by the predecessor processing unit 220k+1 (not shown) in the chain 210; and q(k+1), an ongoing sum value indicated by the predecessor processing unit 220k+1 in the chain 210. The processing unit 220$k$ furnishes two output signals (to the successor processing unit 220$k$−1 (not shown)) that indicate two respective values: r(k) and q(k). Mathematically, r(k) and q(k) may be described by the following equations:

$$r(k)=r(k+1)$$

$$q(k)=q(k+1)+C(x)\cdot\{p(k)+r(k+1)\}$$

Based on the above-described principle of operation, it may be observed that r(k+1)=x(i−j) when p(k)=x(i+j), and thus, for these input values, q(k)=C(j)·[x(i+j)+x(i−j)].

Referring back to FIG. 20, as an example, in some embodiments, the processing units $220_0$, $220_1$, . . . , $220_k$, . . . $220_{n-1}$, $220_n$ are associated with the C(n), C(n−1), . . . C(k), . . . C(1), C(0) coefficients, respectively, and the processing chain 210 begins with processing unit $220_n$ and ends with the processing unit $220_0$. Thus, as an example, for a particular output value, the processing unit 220$n$ provides the first product (called the C(0) product) by multiplying the x(i) value by C(0). For j=0, x(i+j) equals x(i−j) equals x(i). The product that is provided by the processing unit 220$n$ begins a sum to which all the processing units 220 contribute another product. In this manner, the processing unit 220$n$−1 receives signals from the processing unit 220 that indicate the C(O)·x(i) product. The processing unit 220$n$−1 adds the term C(1)·[x(i+1)+x(i−1)], called the C(1) product, to the ongoing sum and furnishes signals to the next processing unit in the chain, etc. Eventually, the processing unit $220_0$ adds the last product (the C(N)·[(x+N)+(x−N)] product) to the rolling sum to generate the signal at the output terminals 211. It is noted that when the processing chain 210 receives x(0) to begin the filtering, N+1 clock cycles are consumed to produce the first valid output value. However, thereafter, the processing chain 210 may produce an output on every clock cycle, thereby resulting in 100% throughput.

Referring back to FIG. 21, as an example, in some embodiments, the processing unit 220$k$ may include input 222 and output 224 registers that delay the digital signal that indicates each r(k+1) value before communicating the signal to the successor processing unit 220$k$−1. In this manner, in some embodiments, the input register 222 receives the digital signal that indicates the r(k) signal (via the input lines 304) on a positive edge (for example) of a processing clock signal (called $CLK_1$) and communicates the stored digital signal to the output register 224 on the next positive edge (as an example) of the $CLK_1$ signal. The output register 224 indicates (via the output lines 308) the stored digital signal (i.e., indicates the r(k) value) to the successor input register 222 in the processing chain 210.

The processing unit 220$k$ also includes an adder 232, a multiplier 234 and an adder 236 to generate the q(k) value. In some embodiments, these components are clocked by a clock signal (called $CLK_2$) that is synchronized to the $CLK_1$ clock signal and has a frequency that is a multiple of the frequency of the $CLK_1$ clock signal so that the q(k) signal is generated on each positive edge (for example) of the $CLK_1$ signal. In this manner, the adder 232 is coupled to receive the digital signal that indicates the r(k+1) value synchronously with the reception of the r(k+1) value by the input register 222. The adder 232 adds this digital signal with a digital signal that indicates the current p(k) value to form an indication of p(k)+r(k+1). The multiplier 234 multiplies the digital output signal from the adder 232 with a digital signal that indicates the associated filter coefficient to produce the digital signal that indicates the C(k)·[p(k)+r(k+1)] signal.

The digital signal that indicates the filter coefficient is stored in a coefficient register 230. The coefficient may be changed via data and control lines 216 that are coupled to the register 230. The adder 236 combines the digital output signal from the multiplier 234 with the q(k+1) signal to produce the digital output signal (on the output lines 310) that indicates the q(k) value.

Figure 22:
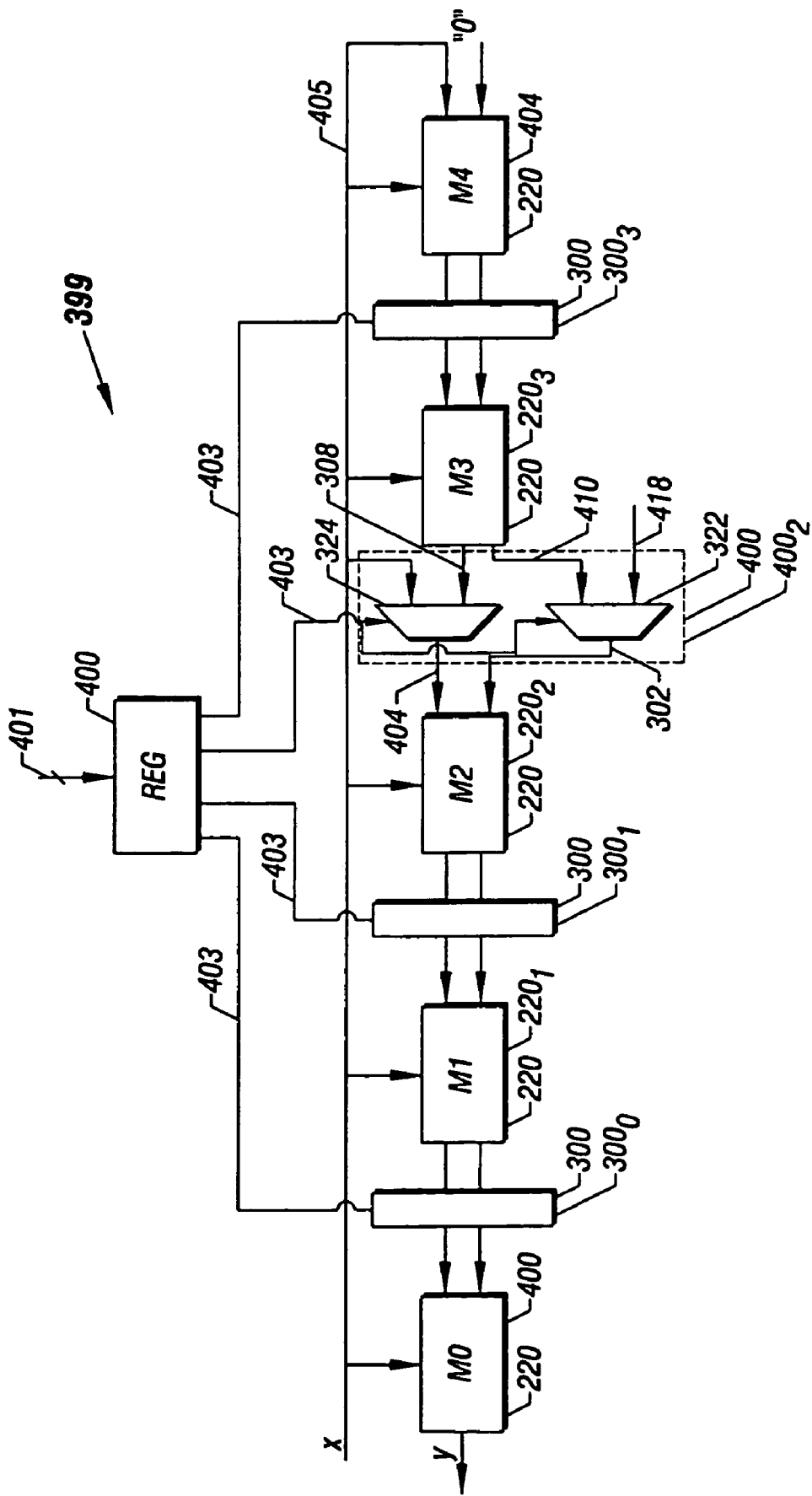
FIG. 22 is a more detailed schematic diagram of the digital filter system of FIG. 19 according to an embodiment of the invention.

FIG. 22 depicts an example of the integration of the processing chain 210 and the tap selecting circuit 168 to form a selectable tap filter 399 that permits tap selection. In this manner, the filter 399 includes a processing chain of five processing units $220_0$, $220_1$, $220_2$, $220_3$ and $220_4$. The filter 1399 also includes four termination units $300_0$, $300_1$, $300_2$, and $300_3$ (of the same design 300) that are associated with the processing units $220_0$, $220_1$, $220_2$, and $220_3$, respectively. In this manner, a particular termination unit 300 may be selected (via the appropriate bit in a register 400) to terminate the processing chain at its associated processing unit 220. For example, the termination unit $300_2$ may be selected to terminate the processing chain at the processing unit $220_2$ and thus, create a five tap processing chain. Similarly, the termination unit $300_1$ may be selected to terminate the processing chain at the processing unit $220_1$ and thus, create a three tap processing chain.

The selection of a particular termination unit 300 may be accomplished via selection lines 303, each of which extends to a different termination unit 300. In this manner, when a particular selection line 303 is asserted (driven high, for example) the associated termination unit 300 is selected and thus, the number of taps is selected. It is noted that only one selection line 303 is asserted, and the remaining selection lines 303 are deasserted (driven low, for example). The selection lines 303 may indicate respective selection bits of a selection register 400, and the selection bits may be stored in the register 200 via data and control lines 401.

As depicted by the termination unit $300_2$, each termination unit 200 may include a multiplexer 324 that selects either the broadcast input lines 405 (when the termination unit 300 is selected) or the output lines 308 (when the termination unit 300 is deselected) of the predecessor processing unit 220 and couples the selected lines to the input lines 304. The termination unit 300 may also include another multiplexer 322 that selects either the output lines 310 (when the termination unit 300 is selected) of the previous processing unit 220 or the lines 318 (when the termination unit 300 is deselected) indicative of "0" (i.e., a zero sum) and couples the selected lines to the input lines 302.

Figure 23:
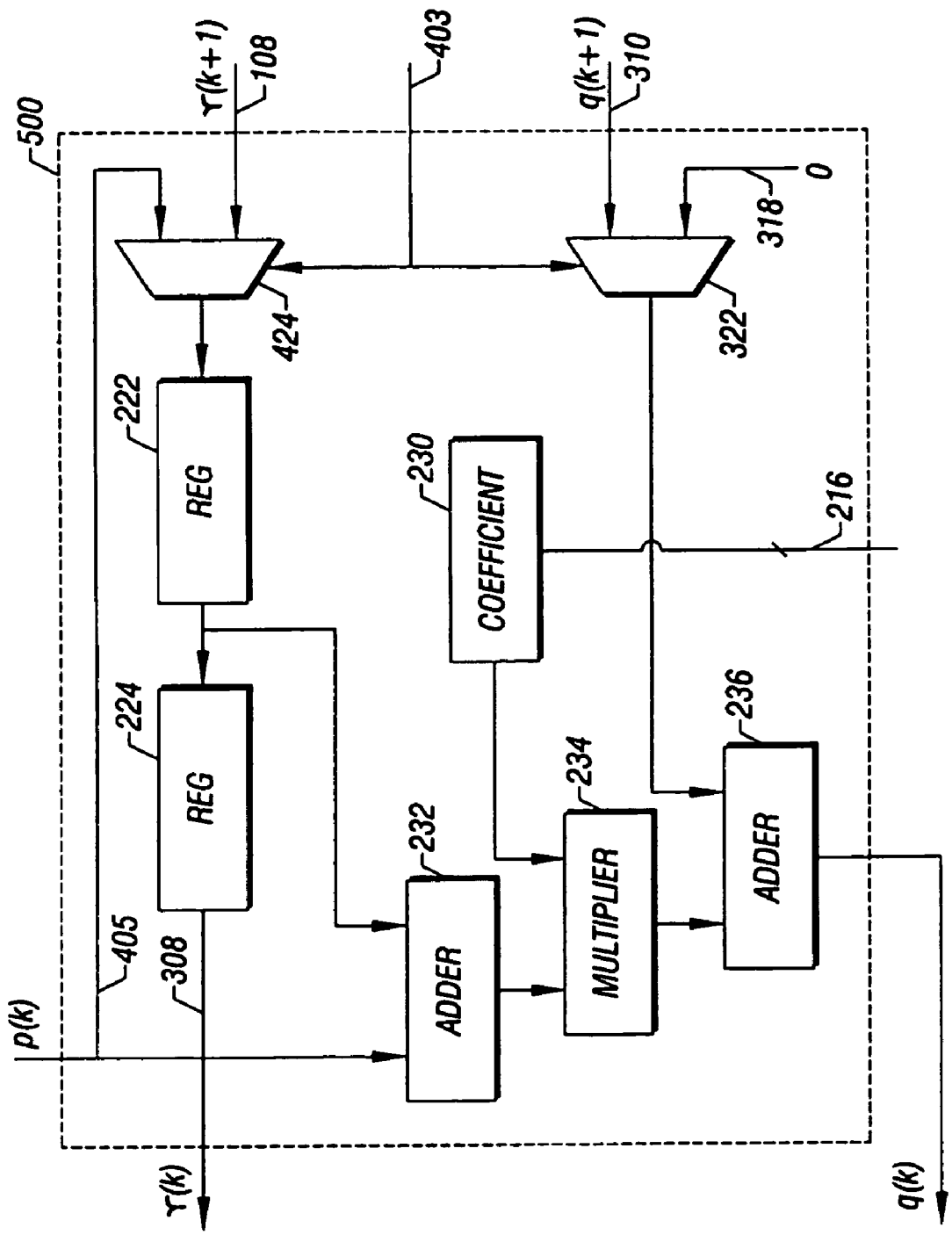
FIG. 23 is a schematic diagram of a unit that may be replicated to form a processing chain according to another embodiment of the invention.

Referring to FIG. 23, in some embodiments, the processing unit and termination unit may be combined to form a combined unit 500. In this manner, the unit 500 may be replicated to form a processing chain of an arbitrary length. This processing chain may be effectively truncated as needed to suit a particular filtering application, as described above.

Referring back to FIG. 19, the register or tap selection circuit 168 is controlled by a controller 504 which may be any conventional processor-based system. The controller 504 may store software 502 which controls the controller 504. The controller 504 may have an output 201 that controls the tap selection circuit 168 and an output 162 which controls the multiplexer 164.

Figure 24:
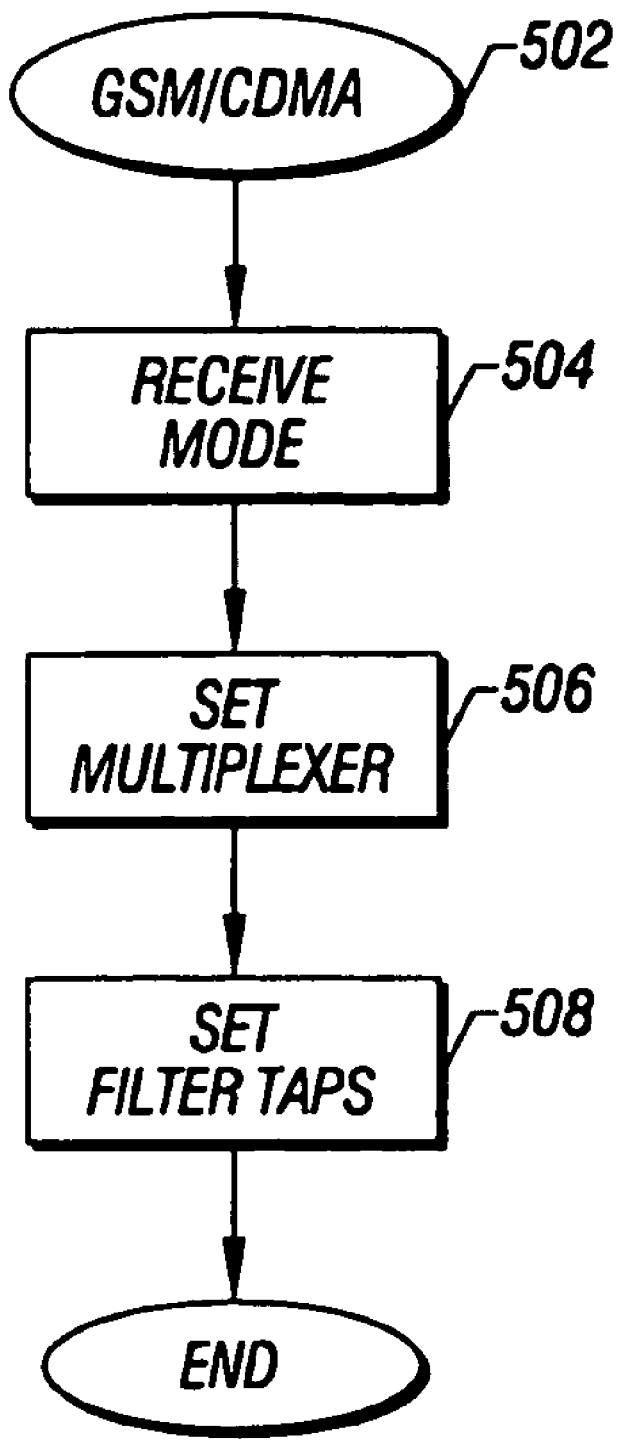
FIG. 24 is a flow chart for software in accordance with one embodiment of the present invention.

Referring to FIG. 24, the software 502 initially determines the mode, whether GSM or W-CDMA, as indicated in block 504. If the system determines that the signals are W-CDMA signals, it sets the multiplexer 506 to output the signal received from the filter 142, as indicated in block 506. It also sets the filter taps on the filter 142*a* to twenty-one taps to implement the appropriate filtering coefficients.

Conversely, if the system detects GSM mode signals in block 504, the multiplexer 164 is set to the output 166 as indicated in block 506. The filter taps of the programmable filter 142*a* are set to fifty-three taps and the filter 144*a* may be set to twenty-seven taps as indicated in block 508.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A cellular transceiver comprising:
 a first digital decimation filter to pass N bands; and
 a second digital decimation filter to reject all but one of said N bands coupled to said first digital decimation filter, wherein said first and second digital decimation filters are programmable tap filters and said first digital decimation filter to selectively implement a digital square-root-raised-cosine filter for a Wideband Code Division Multiple Access mode or a digital filter for a Global System for Mobile Communication mode.

2. The transceiver of claim 1 including a controller that selectively programs said first digital decimation filter to provide an output for a Wideband Code Division Multiple Access mode.

3. The transceiver of claim 2 wherein said first digital decimation filter is coupled to a controller that is programmable to cause said first digital decimation filter to output N bands for a Global System for Mobile communication mode.

4. The transceiver of claim 2 wherein said first digital decimation filter and said second digital decimation filter provide an output for the transceiver when receiving a Global System for Mobile communication signal and said first digital decimation filter provides an output when the cellular transceiver is receiving a Wideband Code Division Multiple Access signal.

5. The transceiver of claim 4 wherein said first digital decimation filter is programmable to have either twenty-one or fifty-three taps.

6. The transceiver of claim 5 wherein said second digital decimation filter has twenty-seven taps.

7. The transceiver of claim 1 wherein said first and second digital decimation filters each have filter coefficients.

8. The transceiver of claim 7 including a memory that provides less than all of the coefficients from said first digital decimation filter to said second digital decimation filter.

9. The transceiver of claim 1 wherein the output from said first digital decimation filter and the output from said second digital decimation filter are coupled to a multiplexer, the output of said multiplexer being selectively controllable depending on the nature of a received signal.

10. The transceiver of claim 9 wherein the output of said multiplexer depends on whether the transceiver is utilized in a Global System for Mobile communication or a Wideband Code Division Multiple Access system.

11. The transceiver of claim 10 including a controller that selects the output of the first digital decimation filter when the transceiver is located in a Wideband Code Division Multiple Access system and selects the output of the second digital decimation filter when the transceiver is in a Global System for Mobile communication system.

12. The transceiver of claim 11 wherein the output from said second digital decimation filter is a result of filtering by said first digital decimation filter and said second digital decimation filter.

13. The transceiver of claim 10 using an anti-alias analog filter and analog-to-digital converter that is the same for bot Global System for Mobile communication and Wideband Code Division Multiple Access systems.

14. A method of receiving cellular signals comprising:
 providing a first filtering stage and a second filtering stage;
 detecting a type of signal that has been received;
 selectively programming said first stage to filter a Wideband Code Division Multiple Access signal or a Global System for Mobile communication signal;
 providing said second stage to filter the Global System for Mobile communication signal; and
 selectively using said first and second stages based on the type of signal detected.

15. The method of claim 14 including selectively setting a number of taps in said first filter stage to provide a square-root-raised-cosine filter for a Wideband Code Division Multiple Access mode.

16. The method of claim 14 including using said first stage to filter N bands and said second stage to reject one less than the N bands.

17. The method of claim 14 including selectively filtering said input signal depending on whether the input signal is a Global System for Mobile communications signal or a Wideband Code Division Multiple Access signal.

18. The method of claim 14 wherein said first and second filtering stages each have filter coefficients and providing less than all of the coefficients from said first stage to said second stage.

19. The method of claim 14 including using an anti-alias analog filter and an analog-to-digital converter for both Wideband Code Division Multiple Access and Global System for Mobile communication modes.

20. The method of claim 15 including setting the number of taps depending on the type of signal received.

21. The method of claim 20 including setting the number of taps in said first stage to 21 when a Wideband Code Division Multiple Access signal is received.

22. The method of claim 21 including setting the number of taps in said first stage to 53 when a Global System for Mobile communication signal is received.

23. A computer-readable medium storing computer program instructions that, when executed on a computer, cause a processor-based system to:
 selectively set a number of taps in a first filtering stage depending on whether a Wideband Code Division Multiple Access signal or a Global System for Mobile communication signal has been detected; and
 select an output from either the first filtering stage of two filtering stages or from a second filtering stage of the two filtering stages depending on whether a Wideband Code Division Multiple Access or a Global System for Mobile communication signal is received.

24. The medium of claim 23 further storing instructions that cause the processor-based system to control a multiplexer to select an output of said first or said second filtering stage as the output from said filtering stages.

25. The medium of claim 23 wherein the first and second filtering stages each have filter coefficients and further storing instructions that cause the processor-based system to provide less than all coefficients from said first stage to said second stage when a Global System for Mobile communication signal is being received.

26. The medium of claim 25 further storing instructions that cause the processor-based system to set a number of taps in said first filtering stage at twenty-one when a Wideband Code Division Multiple access signal is received and at fifty-three when a Global System for Mobile communication signal is received.

27. The medium of claim 26 further storing instructions that cause the processor-based system to store coefficients from said first filtering stage before passing them to said second filtering stage when a Global System for Mobile communication signal is being received.

* * * * *